US012183124B2

(12) United States Patent
Socorregut

(10) Patent No.: US 12,183,124 B2
(45) Date of Patent: Dec. 31, 2024

(54) WIRELESS PROGRAMMABLE DIGITAL CHESS CLOCK

(71) Applicant: ZmartFun Electronics, Inc., Miami, FL (US)

(72) Inventor: Roberto Socorregut, Miami, FL (US)

(73) Assignee: ZmartFun Electronics, Inc., Miami, FL (US)

( * ) Notice: Subject to any disclaimer, the term of this patent is extended or adjusted under 35 U.S.C. 154(b) by 0 days.

(21) Appl. No.: 18/190,448

(22) Filed: Mar. 27, 2023

(65) Prior Publication Data

US 2023/0230420 A1 Jul. 20, 2023

Related U.S. Application Data

(63) Continuation of application No. 15/981,213, filed on May 16, 2018, now abandoned.

(51) Int. Cl.

*G04G 21/04* (2013.01)
*A63F 3/02* (2006.01)

(Continued)

(52) U.S. Cl.

CPC .................. *G07C 1/28* (2013.01); *A63F 3/02* (2013.01); *G04F 8/006* (2013.01); *G04G 21/04* (2013.01); *A63F 2250/1084* (2013.01)

(58) Field of Classification Search

CPC ........ G07C 1/28; A63F 3/02; A63F 225/1084; G04G 21/04; G04F 8/006

See application file for complete search history.

(56) References Cited

U.S. PATENT DOCUMENTS 4,062,180 A 12/1977 Meshi et al.
4,884,255 A 11/1989 Fischer (Continued)

FOREIGN PATENT DOCUMENTS

CN 206021384 U 3/2017
WO 2004064957 A2 8/2004

OTHER PUBLICATIONS

Wall, William D.; Chess Clocks; 2015; Website available at: http://billwall.phpwebhosting.com/articles/Chess%20clocks2.html; Last accessed Jul. 13, 2018.

(Continued)

*Primary Examiner* — Sean Kayes
(74) *Attorney, Agent, or Firm* — Simpson & Simpson, PLLC

(57) ABSTRACT

A wireless programmable digital chess clock having to a housing, a display mounted in the housing and operatively arranged to display time associated with a first player's clock and operatively arranged to display time associated with a second player's clock, a first switch mounted in the housing and operatively arranged to stop the first player's clock and start the second player's clock when activated; a second switch mounted in the housing and operatively arranged to stop the second player's clock and start the first player's clock when activated, a microcontroller operatively arranged to set and control the first and second players' clocks, and, a near field communication module, in communication with microcontroller, and operatively arranged to receive signals from an external transmitting device, where the signals are used to set the time on the first and second players' clocks.

16 Claims, 16 Drawing Sheets

(51) Int. Cl.
*G04F 8/00* (2006.01)
*G07C 1/28* (2006.01)

(56) References Cited

U.S. PATENT DOCUMENTS

| | | | | |
|---|---|---|---|---|
| 5,420,830 | A | 5/1995 | Camaratta, Jr. et al. | |
| 6,299,345 | B1 | 10/2001 | Burnette | |
| 8,087,672 | B2 | 1/2012 | Malobabic | |
| 8,161,290 | B2 * | 4/2012 | McQuaide, Jr. | H04M 1/675 713/150 |
| 2001/0034256 | A1 | 10/2001 | Green | |
| 2002/0093882 | A1 | 7/2002 | Garlock | |
| 2004/0145114 | A1 | 7/2004 | Ippolito | |
| 2005/0174889 | A1 * | 8/2005 | Marcantonio | G04G 13/028 368/12 |
| 2005/0243655 | A1 | 11/2005 | McCutcheon | |
| 2015/0362893 | A1 * | 12/2015 | Masserot | G04G 5/00 368/4 |
| 2017/0147167 | A1 * | 5/2017 | De Luca | G06F 9/452 |
| 2018/0178113 | A1 * | 6/2018 | Knippen | A63F 3/02 |
| 2018/0217690 | A1 * | 8/2018 | Bauer | G06F 3/0446 |
| 2019/0043281 | A1 * | 2/2019 | Aman | G07C 9/215 |

OTHER PUBLICATIONS

Brighton & Hove Chess Club; Digital Clocks; 2007; Website available at: http://www.brightonandhovechessclub.org/setting-clocks-for-matches; Last accessed Jul. 13, 2018.

ChronosDealer.com; CHRONOS Digital Game Clock User's Guide; 1995; Manual available at: http://s3.chesshouse.com/manuals/clocks/ChronosManual.pdf; Last accessed Jul. 13, 2018.

GARDE; The chess clocks from Ruhla; 2011; Instruction Manual available at: http://www.chesspraga.cz/download/manualy/garde-manual.pdf; Last accessed Jul. 13, 2018.

NXP B.V .; NTAG $I^2C$ plus: NFC Forum T2T with $I^2C$ interface, password protection and energy harvesting; Nov. 30, 2017; Product Data Sheet available at: https://www.nxp.com/docs/en/data-sheet/NT3H2111_2211.pdf; Last accessed Jul. 13, 2018.

Microchip Technology Inc.; TC10; 14/TC1015/TC1185; 50 mA, 100 mA and 150 mA CMOS LDOs with Shutdown and Reference Bypass; 2007; Data Sheet available at: http://ww1.microchip.com/downloads/en/DeviceDoc/21335e.pdf; Last accessed Jul. 13, 2018.

Microchip Technology Inc.; MCP7940N; Battery-Backed $I^2C$™ Real-Time Clock/Calendar with SRAM; 2010; Data Sheet available at: http://ww1.microchip.com/downloads/en/DeviceDoc/20005010F.pdf; Last accessed Jul. 13, 2018.

Texas Instruments; TLV8x3 3-Pin Voltage Supervisors with Active-Low, Open-Drain Reset; Apr. 2011; Data Sheet available at: http://www.ti.com/lit/ds/symlink/tlv803.pdf; Last accessed Jul. 13, 2018.

Chess.com; Looking for ideas on what to add to our chess clock; Apr. 6, 2016; Forum available at: https://www.chess.com/forum/view/chess-equipment/looking-for-ideas-on-what-to-add-to-our-chess-clock; Last accessed Jul. 13, 2018.

Senseinate Inc.; Duel Timer Champion; 2008; Website available at: www.dueltimer.com; Last accessed Jul. 13, 2018.

DGT Projects BV; DGT 2000: The official FIDE Chess Clock; Instruction Manual; Enschede, The Netherlands; Oct. 2005.

Digital Game Technology BV; User manual DGT 3000; Enschede, The Netherlands; Jul. 2014.

Digital Game Technology BV; easy Game Timer; Instruction Manual; Enschede, The Netherlands; Jan. 2008.

Excalibur Electronics, Inc.; Excalibur GameTime™ II; Instruction Guide.

Heath Company; Model GC-1005 Electronic Clock HEATHKIT Assembly Manual; 1972.

Digital Game Technology BV; DGT 960 User Manual; Enschede, The Netherlands; 2008.

Digital Game Technology BV; User Manual DGT1001 (English); Enschede, The Netherlands; 2016.

Digital Game Technology BV; User Manual DGT1002 (English); Enschede, The Netherlands; 2016.

Digital Game Technology BV; DGT XL: The official FIDE chess clock; User Manual; Enschede, The Netherlands; 2003.

Digital Game Technology BV; DGT North American; User Manual; Enschede, The Netherlands; Jan. 2012.

Saitek Ltd.; Saitek Competition Game Clock; User Manual; China; Apr. 11, 2006.

VisualTek; VTEK300 Advanced Chess Clock; User Guide.

Zmartfun Electronics, Inc.; ZMF-II Chess Clocks; User Manual.

Lohrman, Shelby, et al. VisualTek Team, Jun. 4, 2016; "Looking for ideas on what to add to our chess clock", https://www.chess.com/forum/view/chess-equipment, last accessed Aug. 8, 2019.

* cited by examiner

WIRELESS PROGRAMMABLE DIGITAL CHESS CLOCK

CROSS-REFERENCE TO RELATED APPLICATIONS

The application is filed under 35 U.S.C. § 120 as a continuation of U.S. patent application Ser. No. 15/981,213, filed on May 16, 2018, which application is incorporated herein by reference in its entirety.

FIELD

The disclosure relates generally to chess clocks, more particularly to digital chess clocks, and, even more specifically, to a digital chess clock capable of being programmed and set via wireless communication.

REFERENCE TO COMPUTER PROGRAM LISTING APPENDIX

The present application includes a computer program listing appendix. The appendix contains an ASCII text function of the computer program listing or sample file input data, which files are herein incorporated by reference in their entireties, as follows:

NFC-Code.txt 9 KB Created Apr. 1, 2017

Chess-Clock-Basic-Code.txt 96 KB Created Apr. 1, 2017

BACKGROUND

A chess game can take a very long time to play. This is not surprising when one considers that the total number of possible chess games is larger than the number of atoms in the universe. In the mid-19th century, chess matches were long, tedious affairs. Players would sometimes try to win by simply outlasting their opponents. Chess games could last for many hours. In the famous Staunton vs. Saint Amant match of 1843, the average length of each game was approximately nine hours. The twenty-first game of this match took 66 moves and 14.5 hours to complete. These delays ultimately resulted in the creation and evolution of timers and clocks to speed up and control the game, as described in a chronological history by Bill Wall on his webpage http://billwall.phpwebhosting.com/articles/Chess%20clocks2.htm, summarized, copied and paraphrased in part herebelow.

After a famous chess tournament in 1851, the London International Tournament, players were criticized for playing too slowly. This lead to the use of sandglasses to time chess games in tournaments. When it was the first player's turn, the sand in the glass would be allowed to flow. When it was the second player's turn, the first player's sandglass would be set on its side, and the sandglass of the second player would be allowed to flow. Sandglasses were first used for time control at London in 1862 in a match between Adolf Anderssen and Ignác von Kolisch. The time control was 24 moves in two hours. Sandglasses weren't ideal for timing chess games. Temperature and humidity affected the sand flow, so there was little accuracy in the time. Also, an opponent could accidently turn up the wrong end of the sandglass or even mistakenly turn his opponent's sandglass.

Tassilo von Heydebrand and der Lasa (1818-1889), a German chess master and chess historian, was one of the first persons to propose that each player's time should be limited by way of separate clocks.

The first mechanical chess clock (tumbling stop clock) was invented by Thomas Bright Wilson (1843-1915) of Manchester, England in 1883, with advice from Joseph Henry Blackburne. The first time that game clocks were used in a chess tournament was in the London 1883 tournament. The time control was 15 moves in two hours, and a player forfeited if he failed to make the requisite number of moves during the time period. The time piece comprised two balanced clocks on a seesaw beam so that when one was tilted, it stopped and the other started. The tumbling-clock was manufactured by Fattonini & Sons of Bradford, England.

The first patent for a chess clock was issued in 1884 to Amandus Schierwater of Liverpool. These clocks were being used by 1886 in most tournaments. In 1886, Schierwater and Frisch of Liverpool patented a chess clock that showed the ordinary time, but registered on separate dials the period occupied by the players. It also indicated the number of moves in a game and whose turn it was to play. The expiration of time was indicated by the ringing of a bell.

In 1894, tumbler chess clocks were used during the Steinitz-Lasker match for the World Championship in New York.

In 1894, a German firm made a chess clock where the clocks were fixed upon a stand, not movable, where a lever was pushed down that stopped one clock and started the other. This clock was made by Gustav Herzog of Leipzig.

In 1895, Theodore Grosse patented a chess timing device using two pendulum clocks with magnets to restrain the inactive pendulum.

The Jaques "Chess Timing Clock" was introduced in the 1890s and sold for 21 shillings.

In 1899, the "flag" mounted on the chess clock was invented by H. D. B. Meijer of Holland. The flag was suspended and arranged for pivoting about the 11:57 graduation on the clock face and was raised as the minute hand forced it up as it approached 12 o'clock. This made it easier to see the time run out when the flag fell. It took about 20 years before the use of flags became common.

In 1900, the present day push-button clock was first perfected by Veenhoff in Groningen, the Netherlands.

In 1950, Borcherdt GmbH or BHB, was established in Germany and became the leading manufacturer of chess clocks in the world. The company lasted until 1989.

In 1964, the first electronic chess clock was manufactured by a Russian firm, the Kiev Relay and Automatic Works.

In 1973, Bruce Chaney created the first digital chess clock for an undergraduate electrical engineering course at Cornell University. One of the problems with analog clocks with "falling flags" was that, in a close game between two players close to each other in playing strength, and especially in a blitz game, it was possible that both player flags would fall in successive moves, and neither player would notice which flag fell first. Digital clocks solved this problem, as the clocks could be programmed to freeze when one player ran out of time. Also, the clocks could be programmed to sound an alarm or provide some other visual indication (e.g., a blinking display) when one player ran out of time.

In 1975, U.S. Pat. No. 4,062,180 was issued to Joseph Meshi and Jeffrey Ponsor for a microprocessor-based digital chess clock.

In 1985, the first DGT (Digital Games Technology) digital chess clock was built by Ben Bulsink.

In 1988, Bobby Fischer filed a patent application for a new type of digital chess clock that gives each player a fixed period of time at the start of the game and then adds a small amount of time after each move. He used his Fischer clock in his 1992 match with Boris Spassky. Prior to the match, a working model had never been constructed. A Fischer chess clock was made for the event in five days.

In 1995, U.S. Pat. No. 5,420,830 was issued to Frank Camaratta, Jr. and William Goichberg for a chess clock with a delay feature. The purpose of the delay feature is to avoid having games decided simply because one player ran out of time. With a delay, the player clocks don't start to decrement until a set time delay has occurred. For example, with a 5 second delay, the clock delays for 5 seconds before starting to decrement. Time delays, or time increments, are now used in time controls for most organized chess tournaments worldwide.

Today, analog chess clocks, replete with their "falling red flags" are rarely used in tournament chess. Digital chess clocks are now ubiquitous. This is partly due to the fact that the rules of chess to be applied in tournaments by both the United States Chess Federation and The Federation Internationale des Échecs (FIDE), (The World Chess Federation), favor the use of digital chess clocks in tournament play. Most, if not all, national chess federations favor the use of digital chess clocks in tournaments as well.

Since more people play chess than any other game on the planet, it should be no surprise that there have been, and now are, a number of digital chess clock manufacturers and associated models of digital chess clocks. These include Saitek, Garde, ZmartFun, Chronos, Excalibur, Visual-Tek, Leap, and Digital Game Technology DGT). Some of these companies offer several clock models (DGT offers twelve different digital chess clock models at the present time.)

Unfortunately, digital chess clocks are notoriously difficult to set. Instruction manuals for clocks from the manufacturers listed above are typically 10-24 pages in length. Manufacturers recognize this problem, and some have taken steps to make the clocks easier to set. For example, some manufacturers have programmed certain "pre-sets" (often referred to as programs) to accommodate certain common time controls used in tournaments, such as "blitz" (5 minutes per player), or other common time controls. Some, such as Ruhla (manufacturer of the Garde clock), have included a paper label on the rear of its clocks to list the many preprogrammed time settings. And Visual-Tek's clock has a text menu display to help users through the time setting process.

Compounding the issue is the fact that there are myriad time control settings for chess games and tournament play. These time controls, or modes, not only include the time each player has to complete a game, but also an associated time delay or increment associated with each move. It is likely that a tournament chess player will have to reset his clock before every tournament.

Examples of various time modes/controls used in timing chess games include sudden death, simple delay, Bronstein delay, and Fischer delay, each of which is described herebelow:

Sudden death: In this mode, each player's clock is set for a specific time period (e.g., 5 minutes, 10 minutes, 50 minutes, etc.) (Each player may have the same amount of time, or one player may have more or less time than his opponent.) If a player runs out of time before he checkmates his opponent, he loses the game. Typically, each player's clock counts down from a certain number until the display reaches zero, at which point the displays may freeze, or flash/blink, or an alarm may sound to indicate that one player has run out of time.

Simple delay: In this mode, the clock is set for a particular delay. For example, one popular time delay is five (5) seconds. In this mode, when a player hits his button, his clock is stopped. Five seconds later, his opponent's clock begins to decrement. The time associated with the delay is not accumulated. A player either uses all or some of his delay time, but doesn't get to "bank it" or accumulate it to use at another point in the game. This mode is popular among chess players and in tournaments since it guarantees that a player will always have five (5) seconds to make each move. Prior to the implementation of the delay mode, many chess players lamented losing on time, as it was very difficult when in time trouble to concentrate both on the board and on the clock. These days, almost all serious chess players have developed an innate sense of how long they have to move when playing a game with a five (5) second delay. It should be appreciated that the net effect of a simple delay time mode is exactly the same as that of the Bronstein mode described infra, where the difference is that in simple time delay, the delay occurs prior to a move being made whereas in Bronstein mode the delay is added after the fact.

Fischer: In this mode, a specified time increment is added to a player's clock before he makes his move. Time can be accumulated, so if the player moves within the delay period, his remaining time actually increases. For example, if the delay time is five seconds, and a player has four seconds left on his clock, as soon as his opponent moves, he receives the increment and has nine seconds to make a move. If he takes two seconds to move, on the start of his next move he has seven seconds. There is also a variant of this time control that adds the delay after a player makes his move (Fischer after), so the delay is added to the player's remaining time and is available for his next move. If, however, time runs out during his move, the game ends without the delay time being added. This variant prevents the player who is in time-trouble to take advantage of the extra-time.

Bronstein: In this mode, the increment is always added after the move. But unlike Fischer, the maximum increment is not always added. If a player expends more than the specified increment, then the entire increment is added to the player's clock. But if a player has moved faster than the time increment, only the exact amount of time expended by the player is added. For example, if the delay is five seconds, the player has ten seconds left in his clock before his turn and during his turn he spends three seconds, after he presses the clock button to indicate the end of his turn, his clock increases by only three seconds (not five).

In addition to these delay settings, many tournament games are divided into two or more time periods. For example, both players may have two hours in a first time period to make 40 moves each, one hour in a second time period to make 20 moves each, and then enter into a thirty minute sudden death third time period to finish a game. This is but one example of a multiple time period tournament chess game. There are and endless number of possibilities for the number and length of time periods in a tournament chess game.

Part of the reason that digital chess clocks are so hard to set has to do with the manufacturer's desire to keep costs down by minimizing the number of parts in the clock. As shown in FIG. 1, every digital chess clock has at least three buttons (electrical switches): a first player button used to stop a first player's clock and start a second player's clock; a second player button used to stop a second player's clock and start a first player's clock; and a third button used to pause both clocks in the event a dispute arises during a game necessitating intervention by a tournament director. Some clocks also have a separate power switch, while some clocks use one or more of the three buttons described above to control power. Almost all clocks use one or more of the above described three buttons to step through menus and/or options to set the time on each display, set the time delay/increment, turn audible alarms on/off, and turn move counters on/off. Since almost all present day digital chess clocks are driven by a microcontroller, it is less expensive to design the setting function of the clocks to accept inputs from the existing three buttons than it is to add additional switches that could make setting the clock easier and more intuitive. At present for example, a player typically sets a clock by some sequence of tapping one or more of the three buttons, by holding one or more of the buttons down to scroll through menu settings, etc. Exacerbating the issue is that the sequences used varies from manufacturer to manufacturer, and even from model to model from a single manufacturer.

The complexity involved in setting and programming various digital chess clocks is mind-boggling. For example, the 48 page instruction manual for the Chronos clock instructs that to turn the clock on you press the center button, and to turn it off you press and hold the center button, then press either the first player button or the second player button five times. But the 10 page introductory document that accompanies the instruction manual further explains that there are actually four ways to turn the clock on as follows:

"Turn on with neither play switch pressed:
This selects user modes 1 to 4.
Turn on with left play switch pressed:
This selects user modes 5 to 8.
Turn on with right play switch pressed:
This selects user modes 9 to 12.
Turn on with both play switches pressed:
This selects all modes."

And these are just the instructions for turning the clock on and off. The clock has 70+ modes of operation, which are individually selected by additional sequenced button pushes after the clock is turned on.

Some clocks, such as the DGT 2000 model from DGT Projects BV, have a separate on/off switch located on the bottom of the clock housing. Instead of player push buttons atop the housing, this clock uses a rocker arm to start and stop the respective clocks. It has separate push buttons on the front of the housing to select one of thirty two different options, or preprogrammed settings, and instructions to manually change the settings by specific keystrokes. This clock can also be used in a byo-yomi mode which is used to time a game of Shogi (Japanese Chess.) The instruction manual for this clock is 48 pages long, albeit in 6 languages.

The DGT 3000 model also has an on/off button on the bottom of its housing, and is laden with more features than the DGT 2000 models. Moreover, this clock can be used to time non-chess games such as Scrabble. The instruction manual for this feature-laden clock is 120 pages long, albeit in 6 languages.

Suffice it to say that setting a digital chess clock is somewhat complicated. Even among the twelve different models of DGT clocks, each has its own separate instruction manual and there are differences in the way individual models are set. Even the "easy Game Timer" from DGT has a 27 page instruction manual! And this clock uses entirely different types of switches and programming methodology than other DGT models (including the use of a 4-way control button on the face of the housing.)

The Saitek Competition Game Clock (and various other Saitek models) also used a 4-way control pad to set the clock, as well as ancillary slide switches to control power, sound and light. This clock, no longer manufactured, included a 20 page manual.

ZmartFun Electronics, assignee of the present patent application, manufactures an LED digital chess clock, model ZMF-II, and an LCD digital chess clock, model ZMF-Pro. Both models use the above described method of setting and programming the clock using sequenced button pushes to send appropriate signals to the microcontroller.

The Garde digital chess clock manufactured in Germany by Ruhla came in two versions: the "Basic" model and the "Tournament" model. Both included 20 preprogrammed time control settings and a number of electrical switches recessed in the base of the wood housing. Programming of these clocks was done totally with the recessed switches. Again, programming was so involved that the manufacturer actually applied an adhesive instruction label to the rear wall of the clock housing to aid in programming and setting the clock.

The VTEK300 advanced digital chess clock from VisualTek, Inc. attempts to solve some of the problems in programming and setting chess clocks by including some features purportedly not found in other clocks. For example, the user is able to navigate a menu that includes "recent settings" and also includes the ability to display the time control and period being played on the display in addition to the time on each player's clock. Unfortunately, this clock still relies on sequenced button pushes and a lengthy instruction manual (11 pages), although its menu navigation system is arguably an improvement over other similar menu driven clocks.

The inevitable result of this complexity in design and function of present day digital chess clocks is that, quite often, tournament start times are delayed because of players who do not know, or cannot remember, how to set even the clocks they own, while others resort to instruction manuals to set their clocks. Some mistakenly believe that the tournament director should know how to set every make and model of clock (even though the rules of chess clearly assign responsibility for correctly setting the clock on the players.) Almost comically, it is commonplace at some tournaments to find adult players scrambling to find young children to help them set their clocks, since children and scholastic players seem more adept at setting chess clocks than adults. Some older players have even been heard to opine that most digital chess clocks are harder to set than the clocks on 1980s era VCRs (which exhibited the so-called blinking twelve problem—displays that constantly blinked 12:00 because owners couldn't figure out how to set the clock.)

The problem is such that one chess club, in England, has actually resorted to posting instructions on its website to assist its members in setting their clocks: http://www.brightonandhovechessclub.org/setting-clocks-for-matches.

Thus, there is a long-felt need for a digital chess clock that is easy to set. There is a long-felt need for a method of setting a digital chess clock that is very fast. There is a long-felt need for a method of setting a plurality of digital chess clocks quickly. Finally, there is a long-felt need for a chess clock that may be programmed and set wirelessly, and for a digital chess clock that may be set wirelessly using near-field communication of signals from an external device, such as a mobile phone, computer, or other portable electronic device.

SUMMARY

According to aspects illustrated herein, there is provided a wireless programmable digital chess clock, comprising a housing, a display mounted in the housing and operatively arranged to display time associated with a first player's clock and operatively arranged to display time associated with a second player's clock, a first switch mounted in the housing and operatively arranged to stop the first player's clock and start the second player's clock when activated, a second switch mounted in the housing and operatively arranged to stop the second player's clock and start the first player's clock when activated, a microcontroller operatively arranged to set and control the first and second players' clocks, and, a near field communication module, in communication with the microcontroller, and operatively arranged to receive signals from an external transmitting device, where the signals are used to set the time on the first and second players' clocks.

According to aspects illustrated herein, there is also provided a wireless programmable digital chess clock assembly, comprising a programmable digital chess clock and a mobile device operatively arranged to communicate wirelessly with the chess clock to program and set the clock.

A primary object of the invention is to provide a digital chess clock which is easy to program and set.

Another object of the invention is to provide a digital chess clock which may be set wirelessly from a mobile device.

These and other objects, features, and advantages of the present invention will become readily apparent upon a review of the following detailed description of the invention, in view of the drawings and appended claims.

BRIEF DESCRIPTION OF THE SEVERAL VIEWS OF THE DRAWINGS

Various embodiments are disclosed, by way of example only, with reference to the accompanying schematic drawings in which corresponding reference symbols indicate corresponding parts, in which.

DETAILED DESCRIPTION OF EMBODIMENTS

Figure 1:
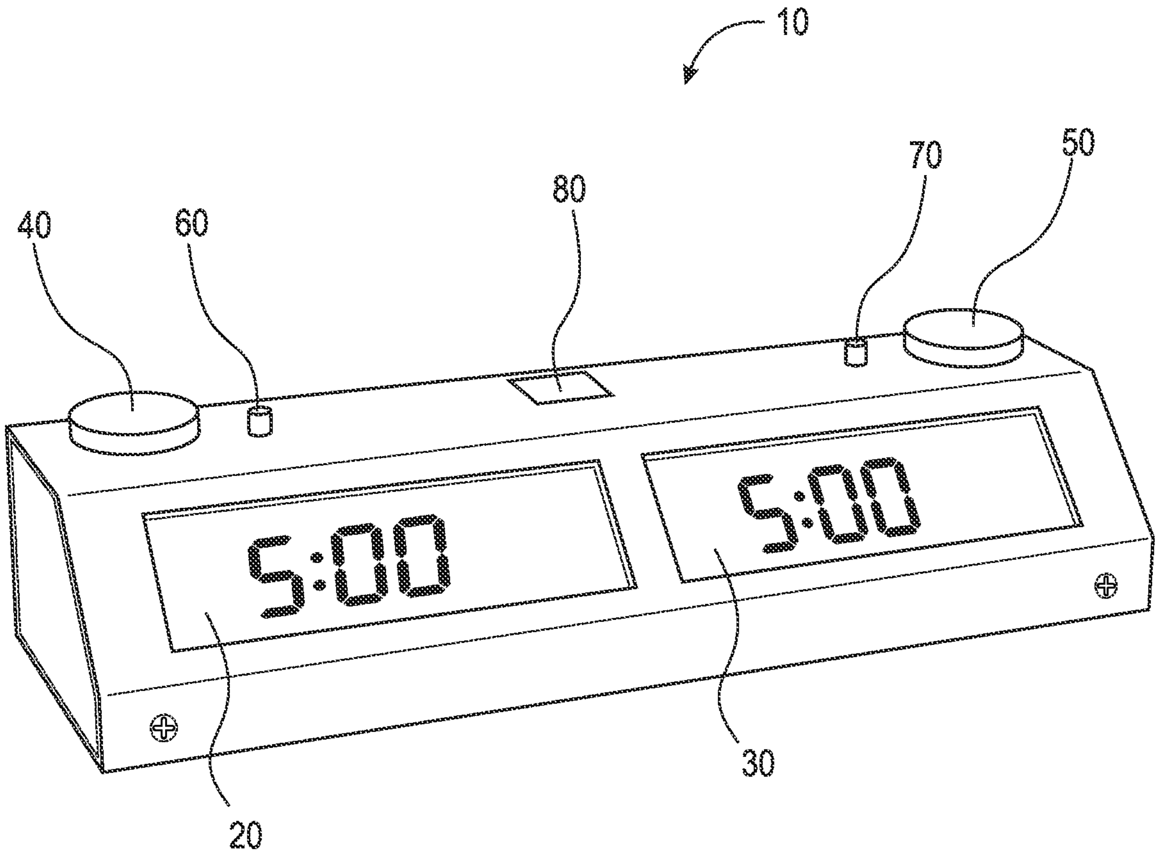
PRIOR ART Fig. 1
FIG. 1 is a front perspective view of a first type of typical prior art digital chess clock.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

The term "time control" as used in the present disclosure is intended to mean the format and rules which define the time allowed to play a particular game of chess. For example, each player must make a certain number of moves, all moves, or all remaining moves in an allotted period of time, theses factors being specified in advance to the players by a tournament director. In a non-sudden death time control, if both players complete the required moves in the allotted time, a new period begins. Each such time period is called a time control. Time controls appear in tournament publicity as number of moves (#), slash (/), time in minutes: #/mm. For instance, if each player must make 40 moves in 1½ hours, this is abbreviated 40/90. In a sudden death time control, the designation "SD" is used. For example, 40/120

SD/60 indicates that 40 moves must be made by each player in two hours (120 minutes) followed by the rest of the moves in the game in one hour (60 minutes). If the time control indicates a delay (pause) time, the abbreviation d/# is used, where # is the delay time in seconds. For example, d/5 indicates a time delay of 5 seconds, which means that the clock display will pause for 5 seconds before starting to decrement. If the time control indicates an incremental (added) time, the abbreviation inc/# (or +#) is used, where the added time # is the incremental time in seconds. For example, inc/30 or +30 indicates an incremental time of 30 seconds, which means that 30 seconds will be added to a player's clock at the conclusion of a move, once the player touches her sensor button.

The terms "wireless communication" and "wireless signal" as used in the present disclosure are intended to mean telecommunications in which electromagnetic waves (rather than some form of wire) carry the signal over part or all of the communication path. The term is intended to include, but not be limited to, near field communication, Bluetooth® communication, and communication over a WiFi network.

The term "touch sensor" as used in the present disclosure is intended to mean a type of equipment that captures and records physical touch of a device and/or object. It enables a device or object to detect touch, typically by a human user or operator. It is intended to include capacitive switches.

The term "mobile device" as used in the present disclosure is intended to mean a portable computing device such as a smartphone or tablet computer.

Adverting now to the Figures, FIG. 1 illustrates a typical prior art digital chess clock. This particular clock, made by Chronos, comprises a housing 10, a first player clock display 20 and a second player clock display 30 mounted in the housing, a first player touch sensor 40 and a second player touch sensor 50 mounted in the housing, a first player LED indicator 60 and a second player LED indicator 70 mounted in the housing, and a central power switch 80. An indicator is "lit" to indicate that that player is "on move", i.e., that player's clock is ticking down. To minimize the expense of hardware in the clock, the clock is set using various combinations of "touches" of the two player buttons and the central power switch (button). For example, to turn this clock on you press the center button, and to turn it off you press and hold the center button, then press either the first player sensor or the second player sensor five times. Other complex keystrokes for setting various functions of this clock are detailed in its instruction manual, available at this website: http://s3.chesshouse.com/manuals/clocks/Chronos-Manual.pdf.

Figure 2:
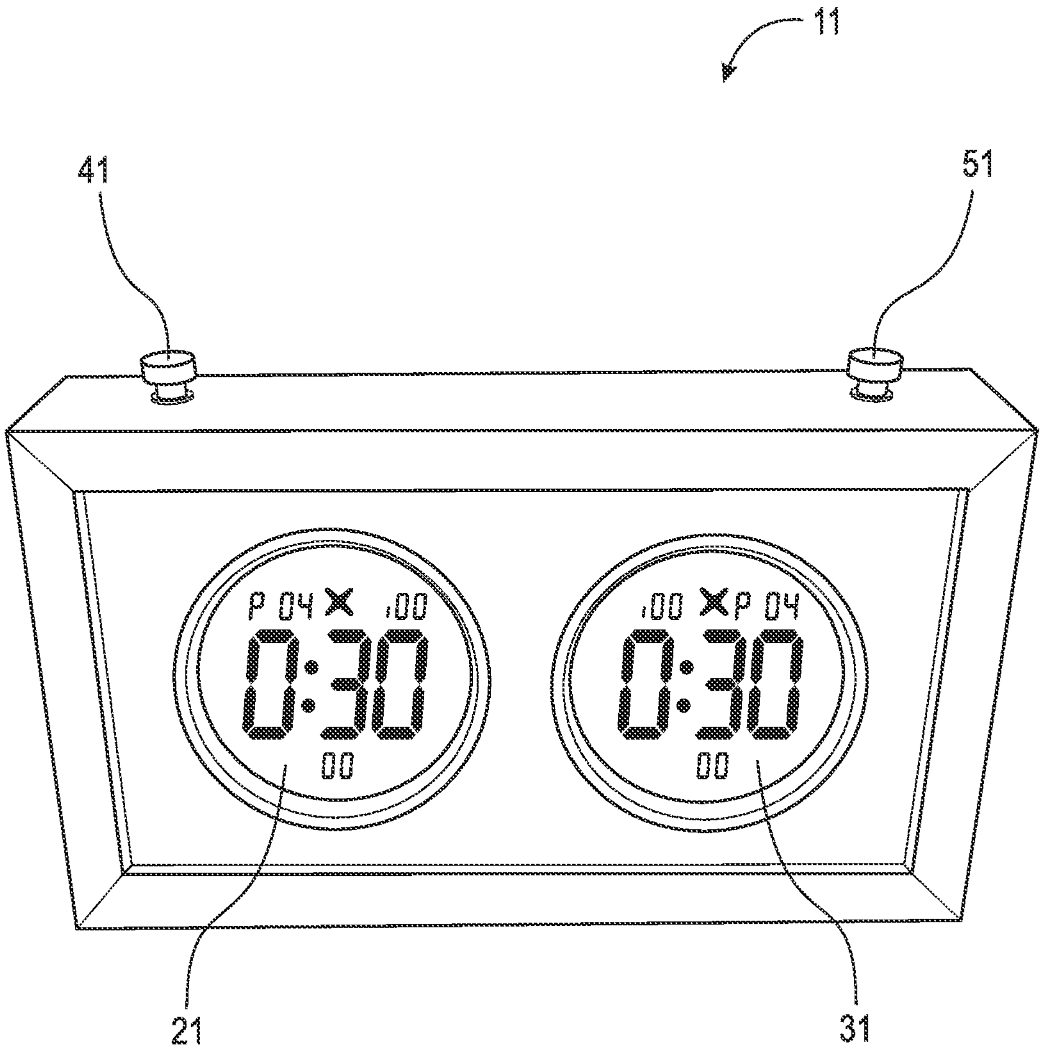
PRIOR ART Fig. 2
FIG. 2 is a front perspective view of a second type of a typical prior art digital chess clock.
Figure 3:
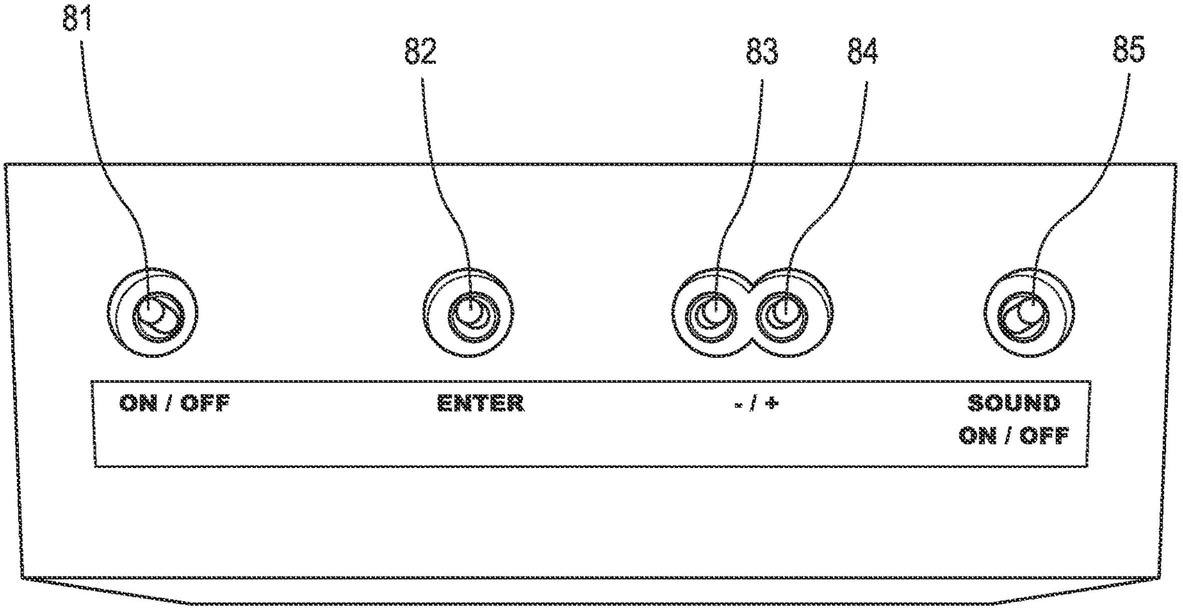
PRIOR ART Fig. 3
FIG. 3 is a bottom view of the housing of the prior art chess clock shown in FIG. 2.

FIG. 2 illustrates a second prior art clock, made by Garde. Similar to the clock shown in FIG. 1, this prior art clock has a housing 11, a first player clock display 21, a second player clock display 31, a first player switch (button) 41 and a second player switch (button) 51. Unlike the Chronos clock shown in FIG. 1, this clock doesn't have a power button atop the housing. Rather, the power (on/off) button is located in a recess in the base of the clock, shown in FIG. 3. As seen in the figure, various electrical switches/buttons are located in the base of the clock, including on/off switch 81, ENTER button 82, minus button 83, plus button 84, and sound button 85. The ENTER and plus/minus buttons are used to both select the program the user intends to program the clock to use during a game, and to set the clocks. Like the Chronos clock, the Garde prior art clock requires a complex set of button pushes (using the ENTER and plus/minus buttons) to step through a number of different available pre-configured time controls available with the clock. For example, as shown in FIG. 2, the user has programmed the clock to follow preset program P04, and set both clocks to 30 minutes each with no time delay. Other complex keystrokes for setting various functions of this clock are detailed in its instruction manual, available at this website: http://www.chesspraga.cz/download/manualy/garde-manual.pdf.

Figure 4:
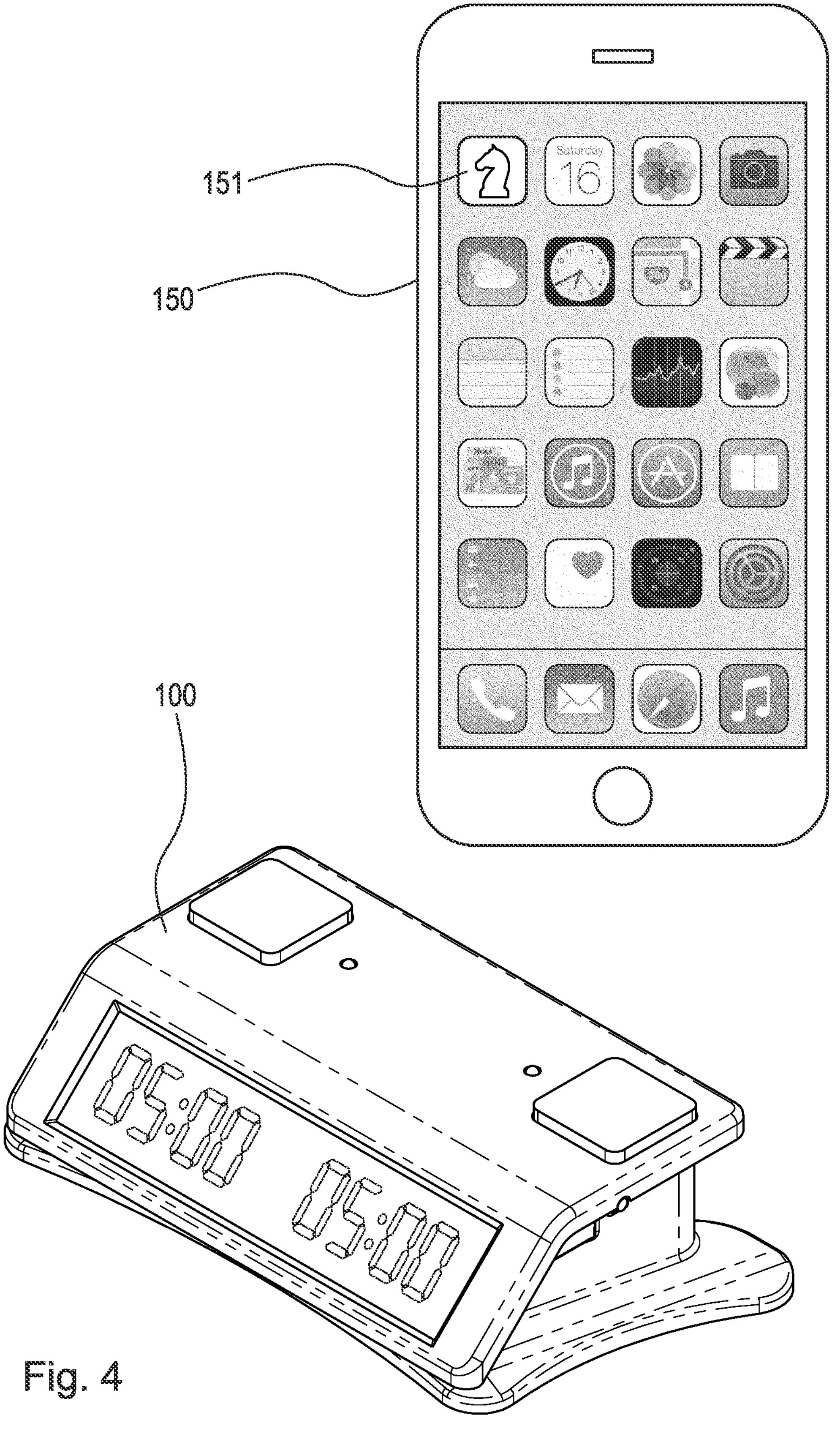
FIG. 4 is a perspective view of the wireless programmable chess clock of the present invention, shown in close proximity to a mobile device used to wirelessly program and set the clock.
Figure 18:
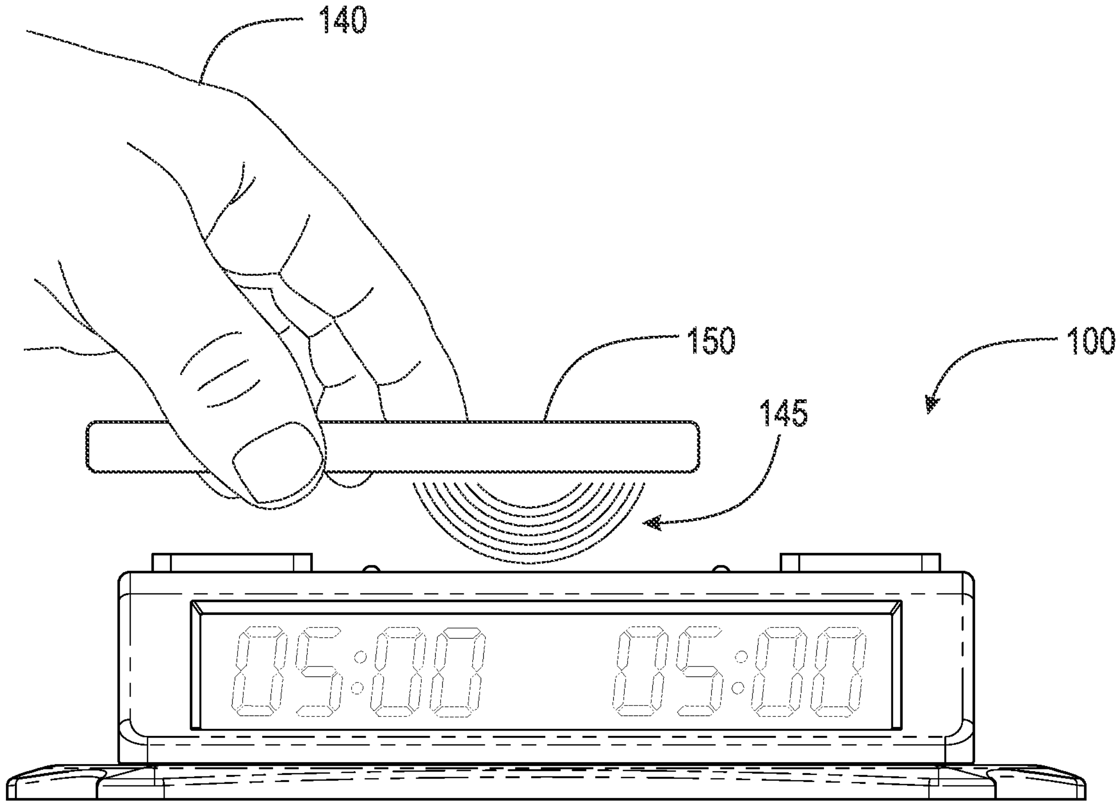

FIG. 4 is a perspective view of wireless programmable digital chess clock 100 of the present invention, shown in close proximity to mobile device 150, which mobile device contains a software application operatively arranged to wirelessly transmit signals to the clock to set it. Device 150 includes icon 151 which is used to access and start the software application. In this drawing mobile device 150 is shown to comprise a smartphone, although the device could take other forms, such as a tablet computer, such as an iPad® device, or a laptop, for example. In operation, as will be described infra, a user uses the software application on the mobile device to select the time settings desired on clock 100. Once the settings have been made on the mobile device, the user brings the mobile device close to the clock itself. Once the mobile device is close enough to the clock, a transmitter from the mobile device sends a signal to the clock to set the clock. This is best illustrated in FIG. 18, where hand 140 of a user is shown holding mobile device 150 in close proximity to clock 100, and wireless signals 145 are being transmitted from the mobile device to the clock to set the clock.

Figure 5:
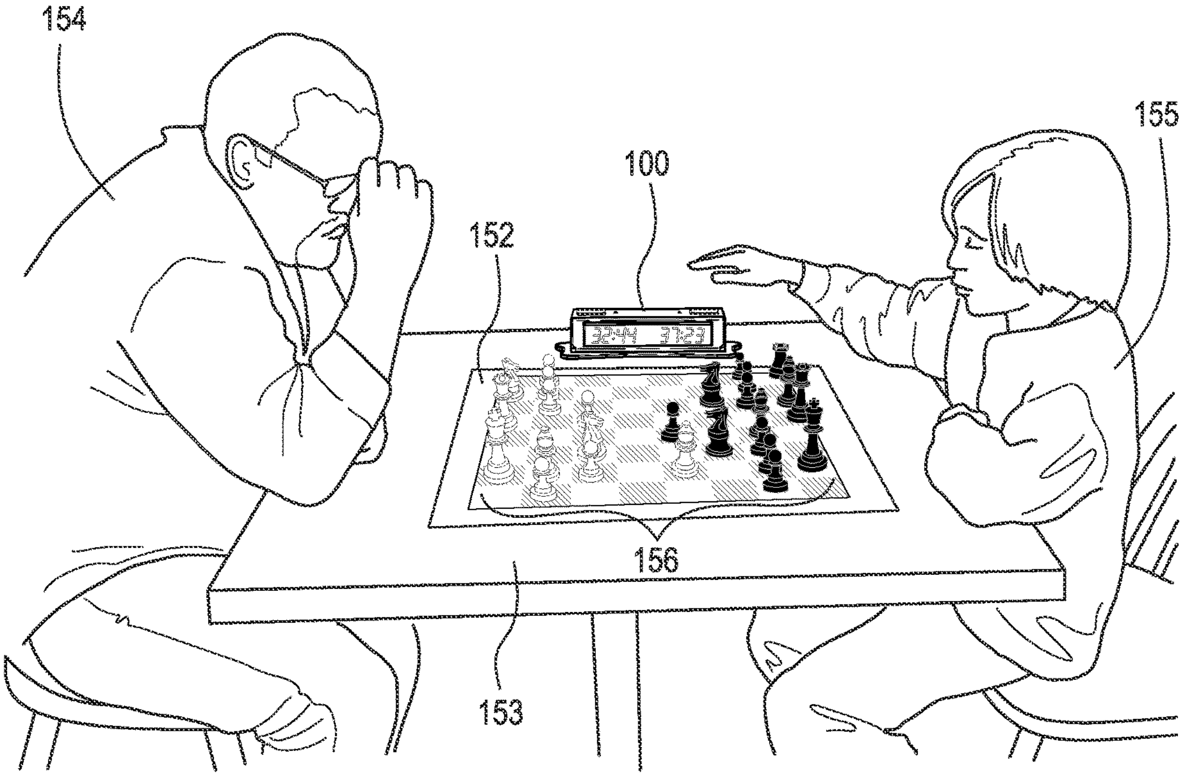
FIG. 5 is a fragmentary perspective view of two chess players playing a game of chess using the wireless programmable chess clock of the present invention.

FIG. 5 is a fragmentary perspective view of two chess players playing a game of chess using wireless programmable chess clock 100. The players are playing a game of chess on chess board 152 which is arranged and resting on table 153. First player 154 is playing with the white chess pieces (not numbered), and second player 155 is playing with the black chess pieces (not numbered). First player 154 is shown to have 32 minutes and 44 seconds remaining on his clock, and second player 155 is shown to have 37 minutes and 23 seconds left on his clock. First player 154's clock display is frozen in the drawing, whereas second player 155's clock display is counting down since player 155 is "on move". Since second player 155 has just made a move, he is shown reaching for the switch/button on his side of the clock. Depressing his button will stop his clock and start his opponent's clock.

Figure 6:
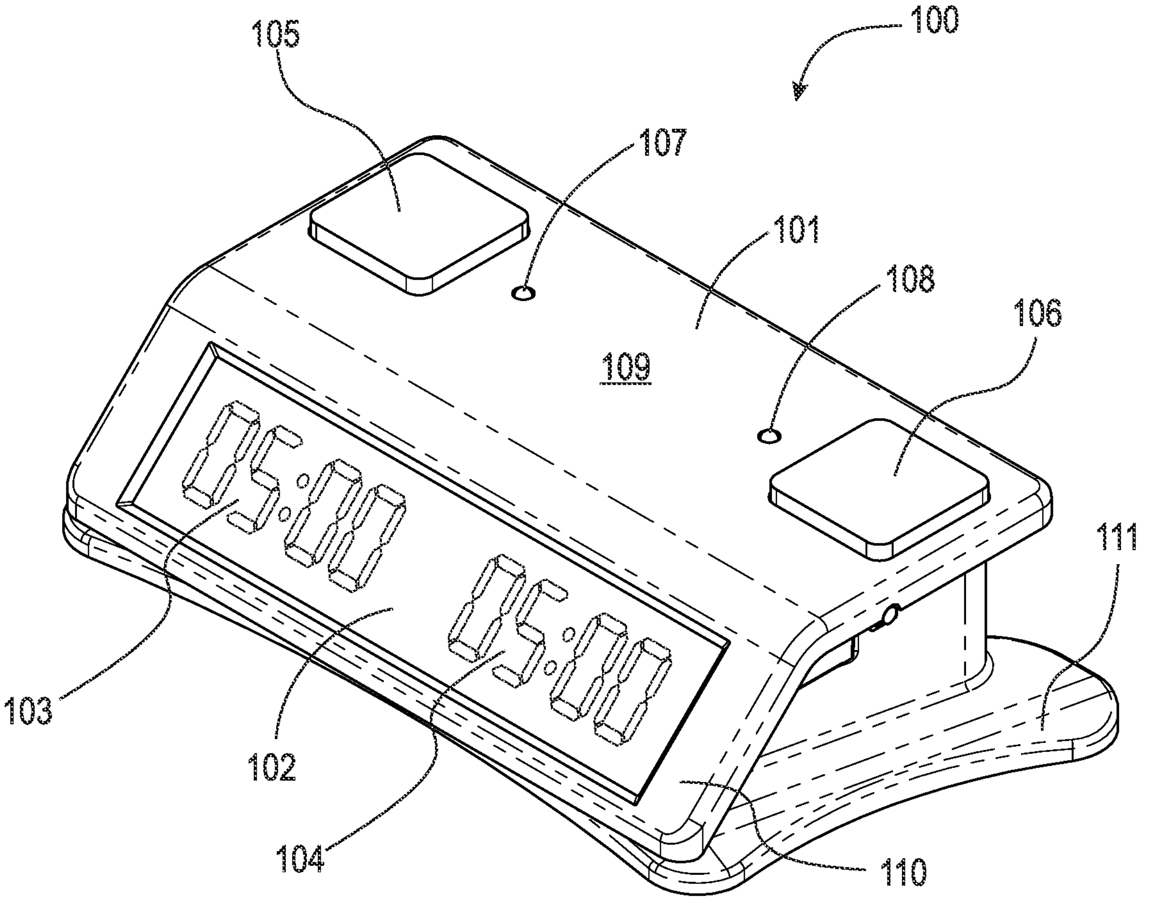
FIG. 6 is a front perspective view of the wireless programmable chess clock of the present invention.
Figure 10:
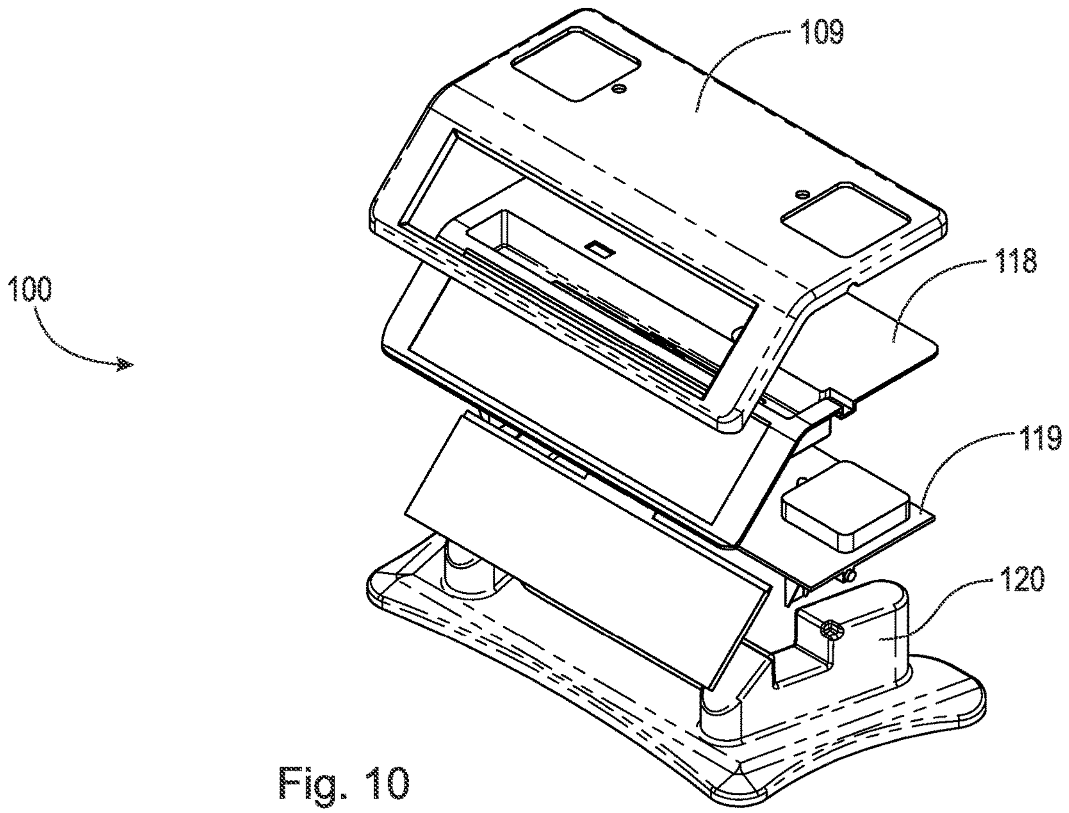
FIG. 10 is an exploded view of the clock shown in FIG. 6.

The wireless programmable digital chess clock of the present invention is shown in a perspective view in FIG. 6. Clock 100 is encased in a housing which includes top housing member 109, display housing member 118 (shown in FIG. 10), sensor electronic board 119 (shown in FIG. 10), and base housing member 120 (shown in FIG. 10). The clock is shown to comprise display 102 which includes first player clock display 103 and second player clock display 104. These displays are programmed to show the time remaining in a chess game. As shown in this view, both clocks have been set for 5 minutes and zero seconds, a typical setting for a game of Blitz chess. The displays are visible through a rectangular aperture in front surface 110 of the housing. Top housing member 109 includes top surface 101. First player touch sensor 105 is mounted through an aperture in surface 101, as is second player sensor 106. Similarly first player LED indicator 107 is mounted through an aperture in surface 101, as is second player LED indicator 108. In operation, when the first player is on move, his clock display will be decrementing and his LED 107 will be lit. This permits spectators to know that he is on the move. Once the first player makes his move on the chessboard, he touches his sensor 105, which simultaneously stops his clock, turns off his LED 107, starts his opponent's clock, and lights second player LED indicator 108. Similarly, when the second player is on move, his clock display will be decrementing and his LED 108 will be lit. Once he completes his move on the chessboard, he touches his sensor 106 which simultaneously stops his clock, turns off his LED 108, starts his opponent's clock and lights first player LED indicator 107. This process continues until the game ends, either by checkmate, stalemate, or draw, or until one of the two players runs out of time. Should a player run out of time, his display will read 0:00 and his opponent's display will freeze with whatever time he has remaining. These are standard operations of all chess clocks and are well known in the art.

Figure 7:
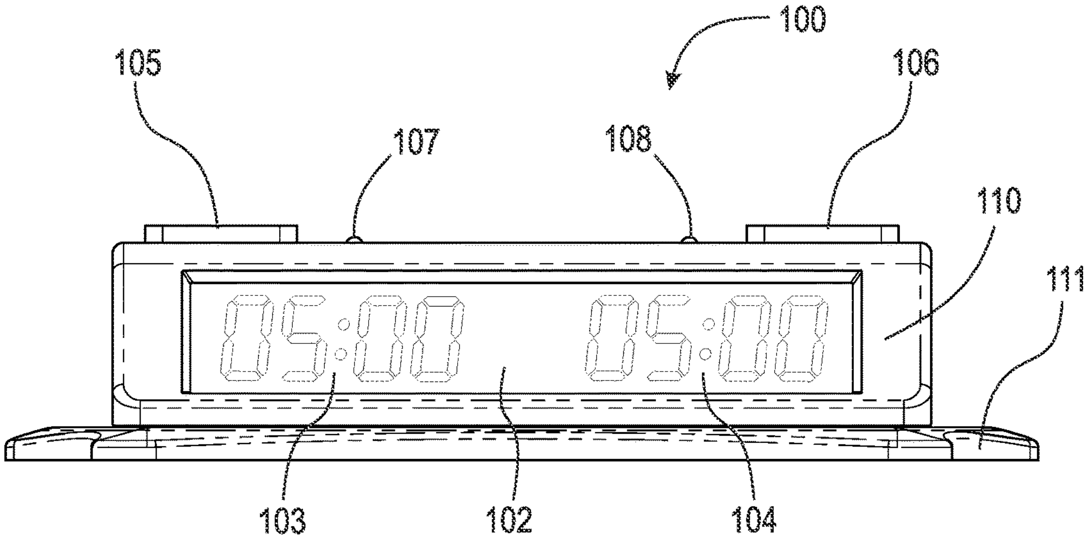
FIG. 7 is a front view of the wireless programmable chess clock shown in FIG. 6.

FIG. 7 is a front elevation view of clock 100.

Figure 8:
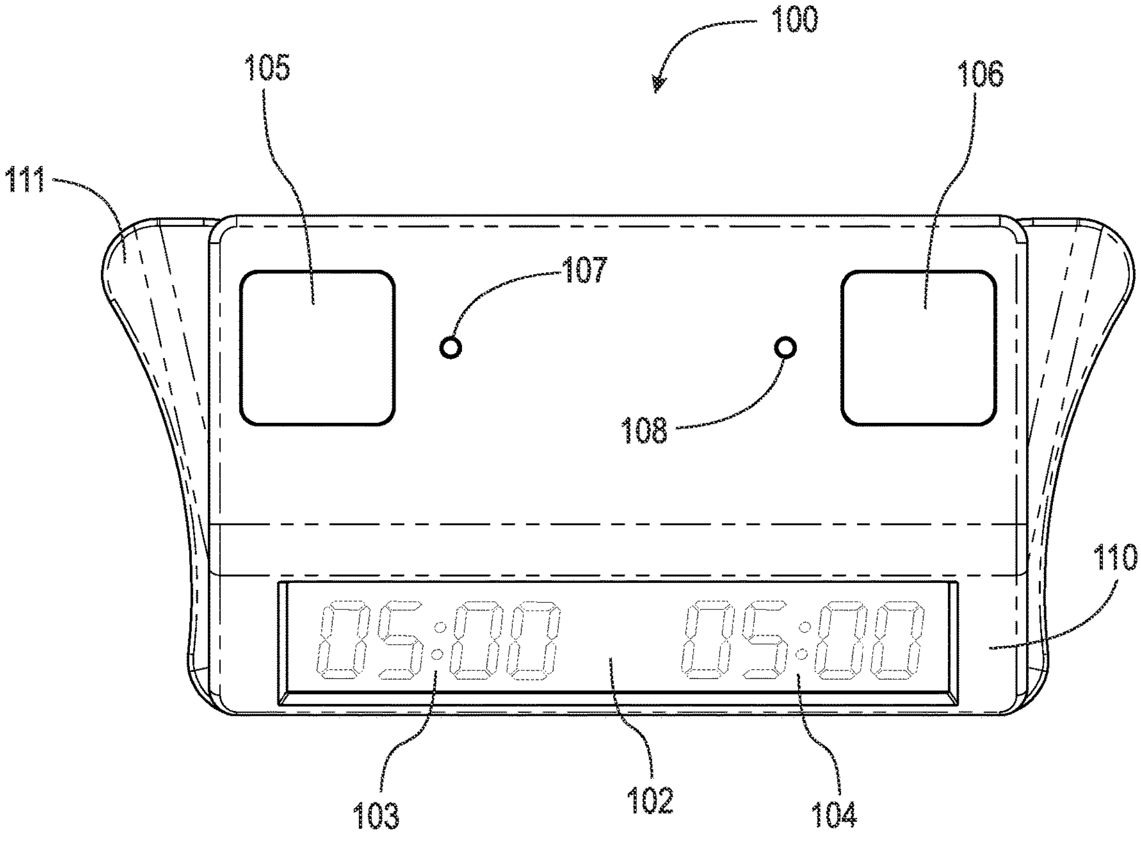
FIG. 8 is a top view of the clock shown in FIG. 6.

FIG. 8 is a top view of clock 100.

Figure 9:
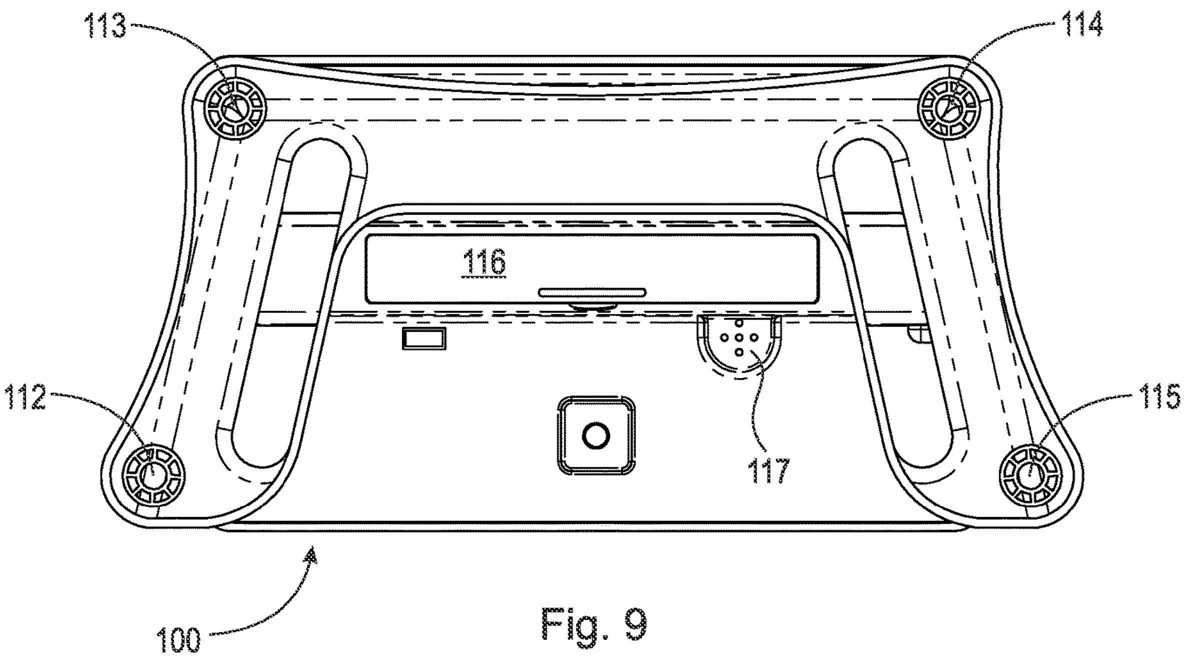
FIG. 9 is a bottom view of the clock shown in FIG. 6.

FIG. 9 is a bottom view of clock 100. This view shows battery compartment 116, speaker 117, and first base foot 112, second base foot 113, third base foot 114, and fourth base foot 115. These base feet are preferably comprises of rubber or a similar material to provide frictional stability between the clock and the surface it is set upon during game play. The speaker may be optionally turned on or off to sound an alarm when a player has run out of time.

Figure 11:
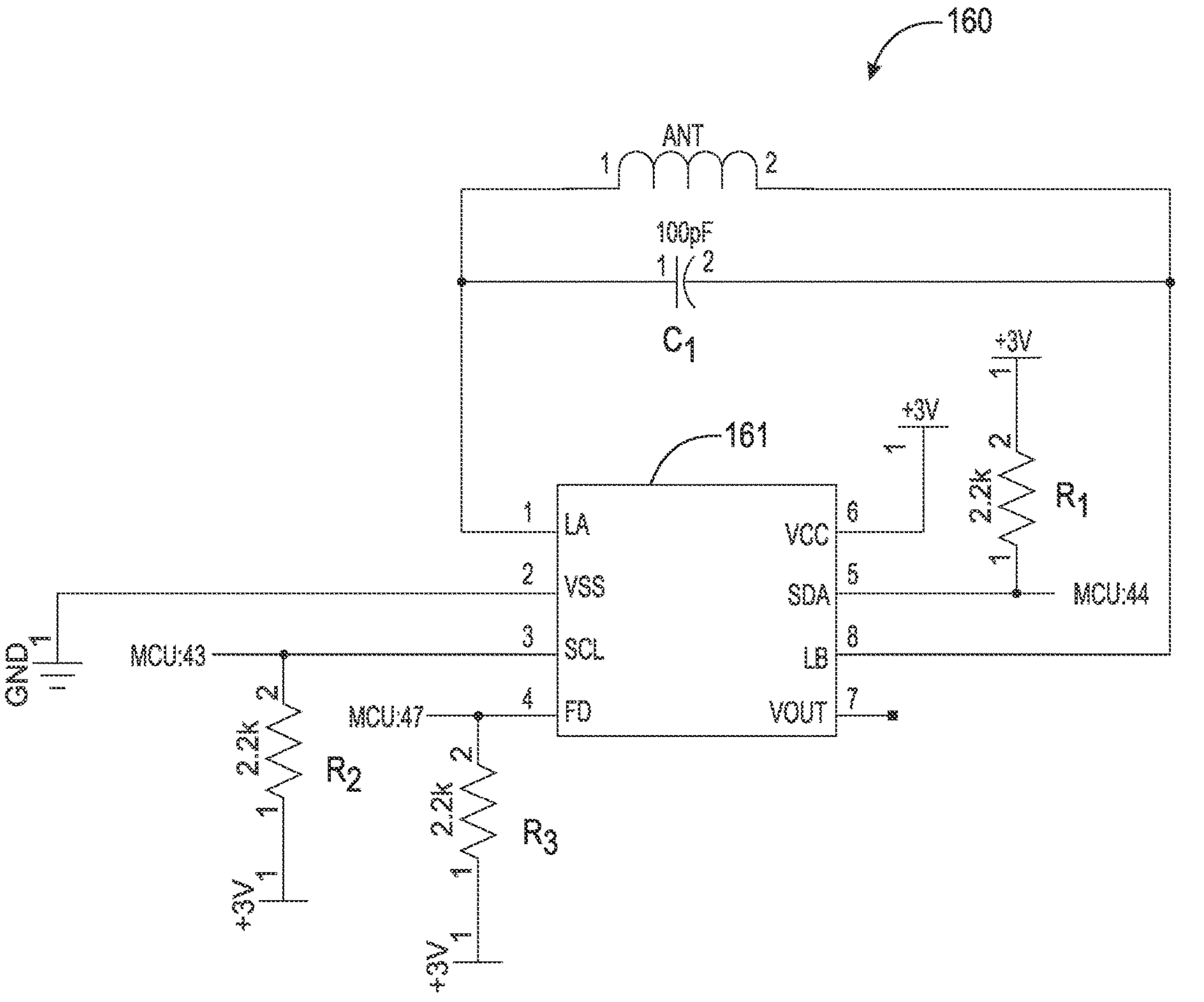
FIGS. 11-15 illustrate the schematic diagram of the present invention.
Figure 16:
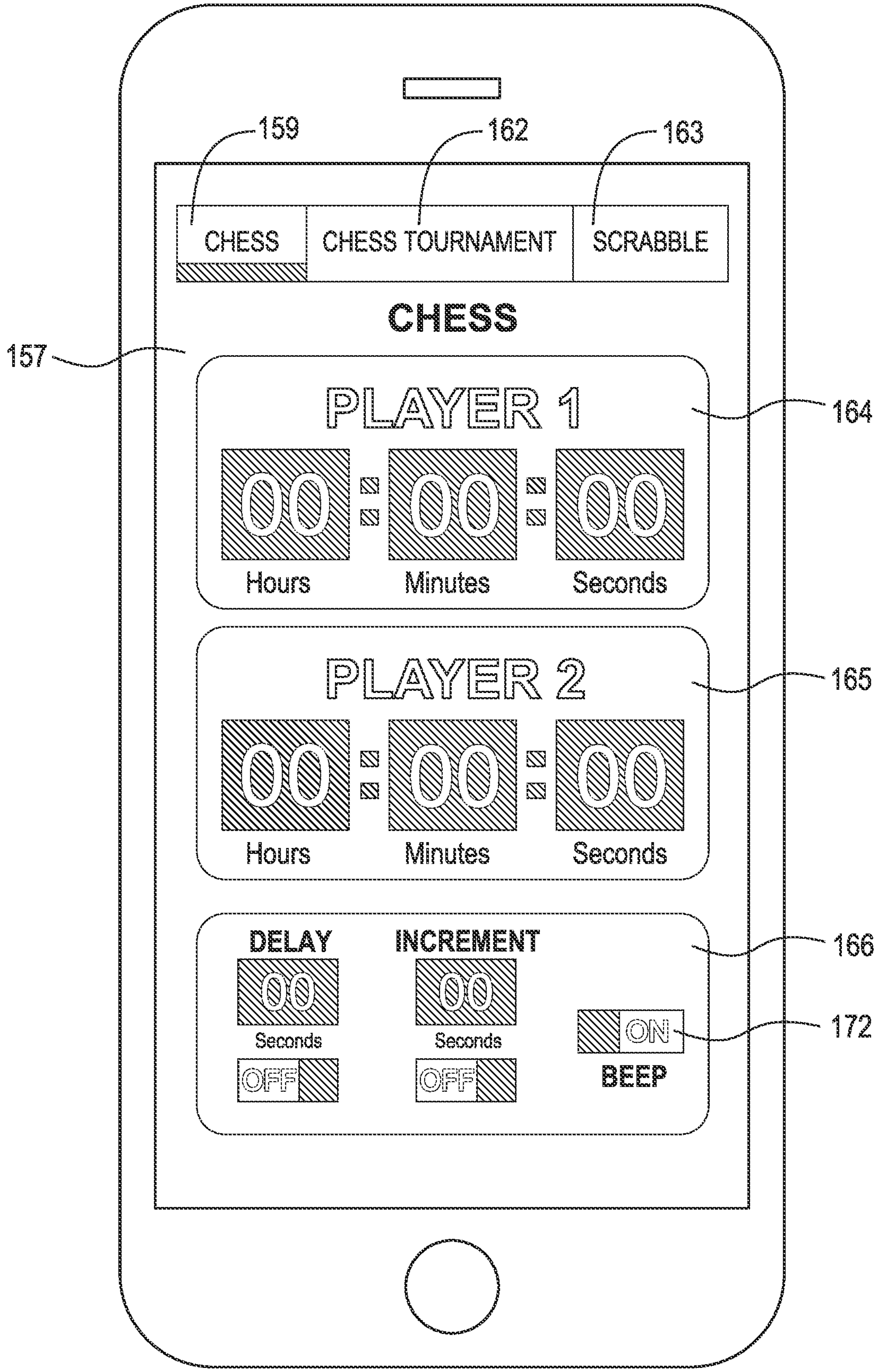
FIG. 16 is a view of a first screen on a mobile device application used to program and set the clock of the present invention.
Figure 17:
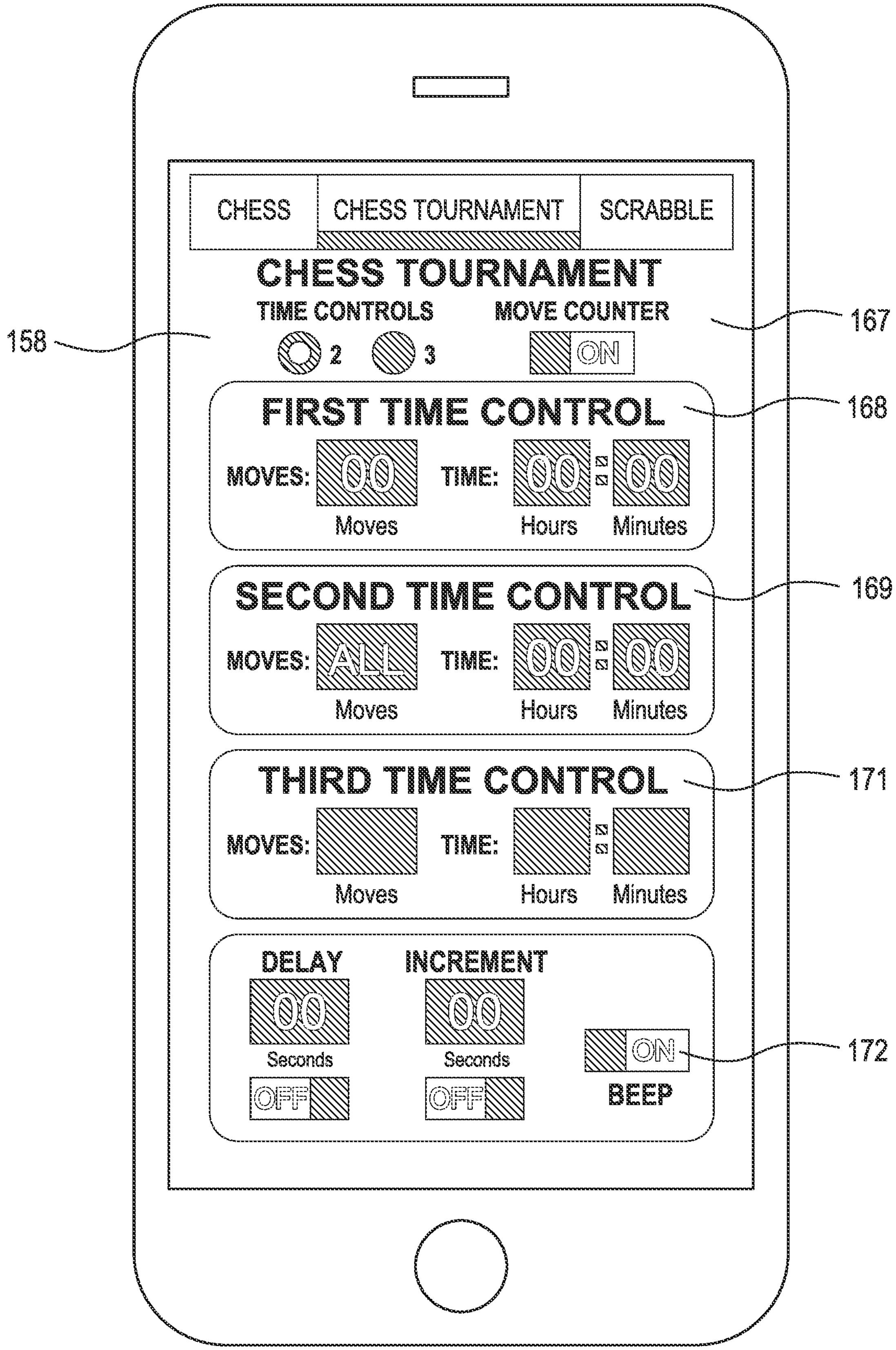
FIG. 17 is a view of a second screen on a mobile device application used to program and set the clock of the present invention; and, FIG. 18 is a view of the mobile device of the invention being held in close proximity to the clock of the invention to set the clock.

FIGS. 11-15 illustrate the electronic schematic of the invention. FIG. 11 illustrates the circuit associated with the near field communication module 160. The circuit includes chip 161 (Model NT3H2111), which is an NFC (near field communication) tag, manufactured by NXP, B. V. The data sheet which completely describes this module and how to program it is found here: https://www.nxp.com/docs/en/data-sheet/NT3H2111_2211.pdf. This module enables two-way wireless near field communication between mobile device 150 and clock 100. The communication occurs automatically when the mobile device is brought close in proximity to the clock. The distance between the clock and mobile device required for communication is variable and depends upon the tuning of the communication module. In a preferred embodiment, the module is tuned such that communication occurs when the module is approximately 1" away from the clock. In operation, the user programs a software application on the mobile device, as shown in FIGS. 16 and 17 and described infra, and this information is transmitted wirelessly to module 160 which, in turn, communicates this information to microcontroller 200, also described infra. Once the mobile device is brought close to the clock, the display on the clock will show the programmed time for the game.

Chip 16 is connected to antenna ANT, capacitor $C_1$, resistors $R_1$, $R_2$ and $R_3$. The chip is powered by a 3V direct current supply. In addition to receiving information for setting the clock from the mobile device, the NFC module is also operatively arranged to transmit data about a chess game being played, or just played, back to the mobile device. For example, in analyzing a chess game that has been played, a player and her coach may find it useful to know how much time a player spent on each move in the game. It should be appreciated that the NT3H2111 chip has an onboard memory to store the elapsed time information (time for each move) for the clock. The memory is cleared whenever the clock is turned off. To extract the clock information from the clock, the user/player would bring his mobile device close to the clock, and the time for each move would be transmitted to his mobile device.

Figure 12:
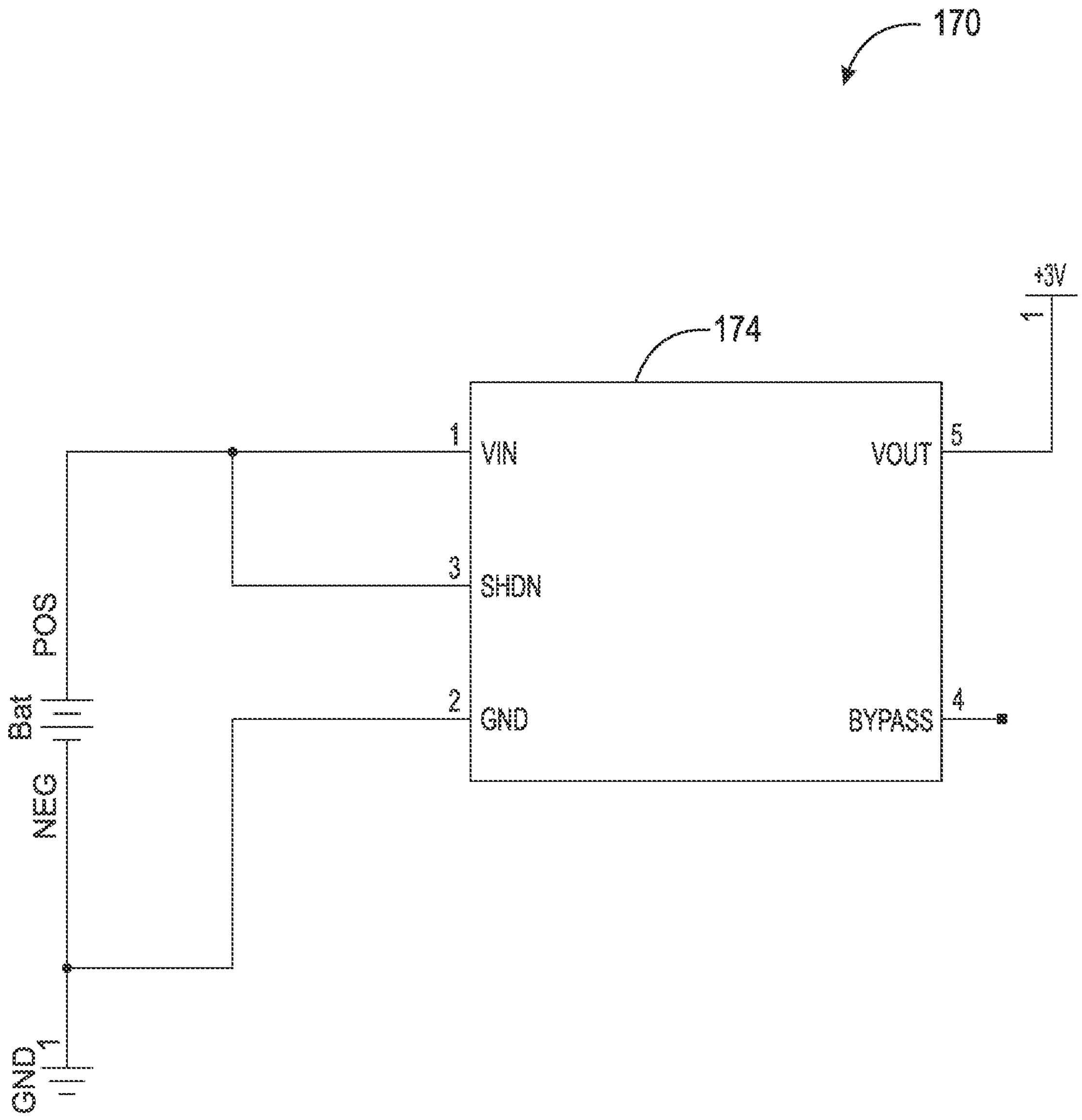

Adverting now to FIG. 12, voltage regulator 170 is illustrated. The clock of the invention operates generally on a supply voltage of 4.5 VDC. This is achieved by three AA cell batteries, arranged in series. Voltage regulator 170 comprises chip 171 (Model TC1185), manufactured by Microchip Technology Inc., which is a CMOS Low Dropout Regulator (LDO) with Shutdown and Reference Bypass chip. In operation, this circuit converts the 4.5 VDC into the operating voltage of 3.0 VDC necessary to run the circuit. The datasheet for this chip is found here: http://ww1.microchip.com/downloads/en/DeviceDoc/21335e.pdf.

Figure 13:
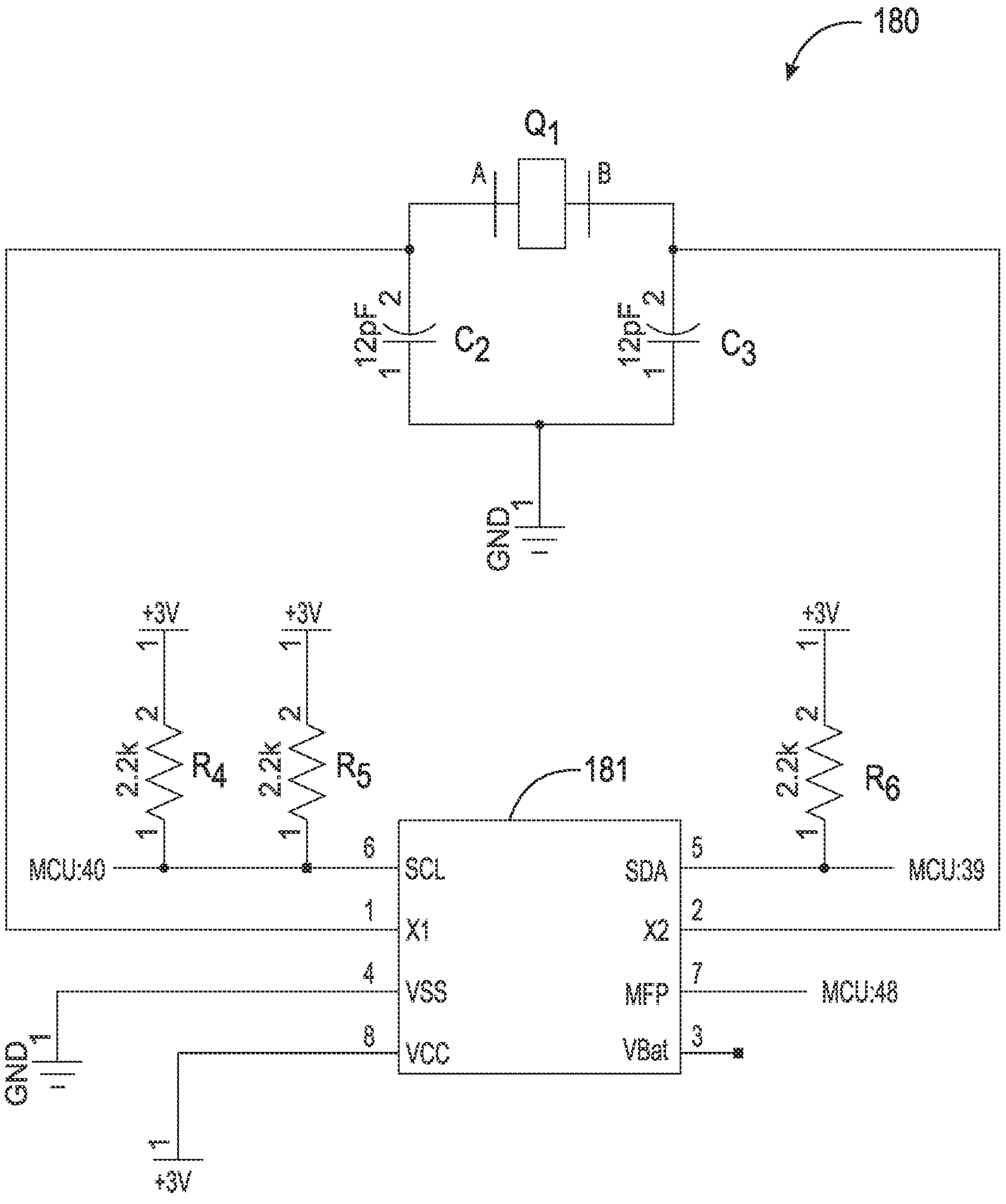

With reference to FIG. 13, timing circuit 180 is shown. The circuit includes quartz crystal oscillator $Q_1$, 32.768 KHz, chip 181 (Model MCP7940) manufactured by Microchip Technology, Inc., as well as capacitors $C_2$ and $C_3$ and resistors $R_4$, $R_5$ and $R_6$. This circuit provides the timing for the clock displays in the clock. The datasheet for this chip is found here: http://ww1.microchip.com/downloads/en/DeviceDoc/20005010F.pdf.

Figure 14:
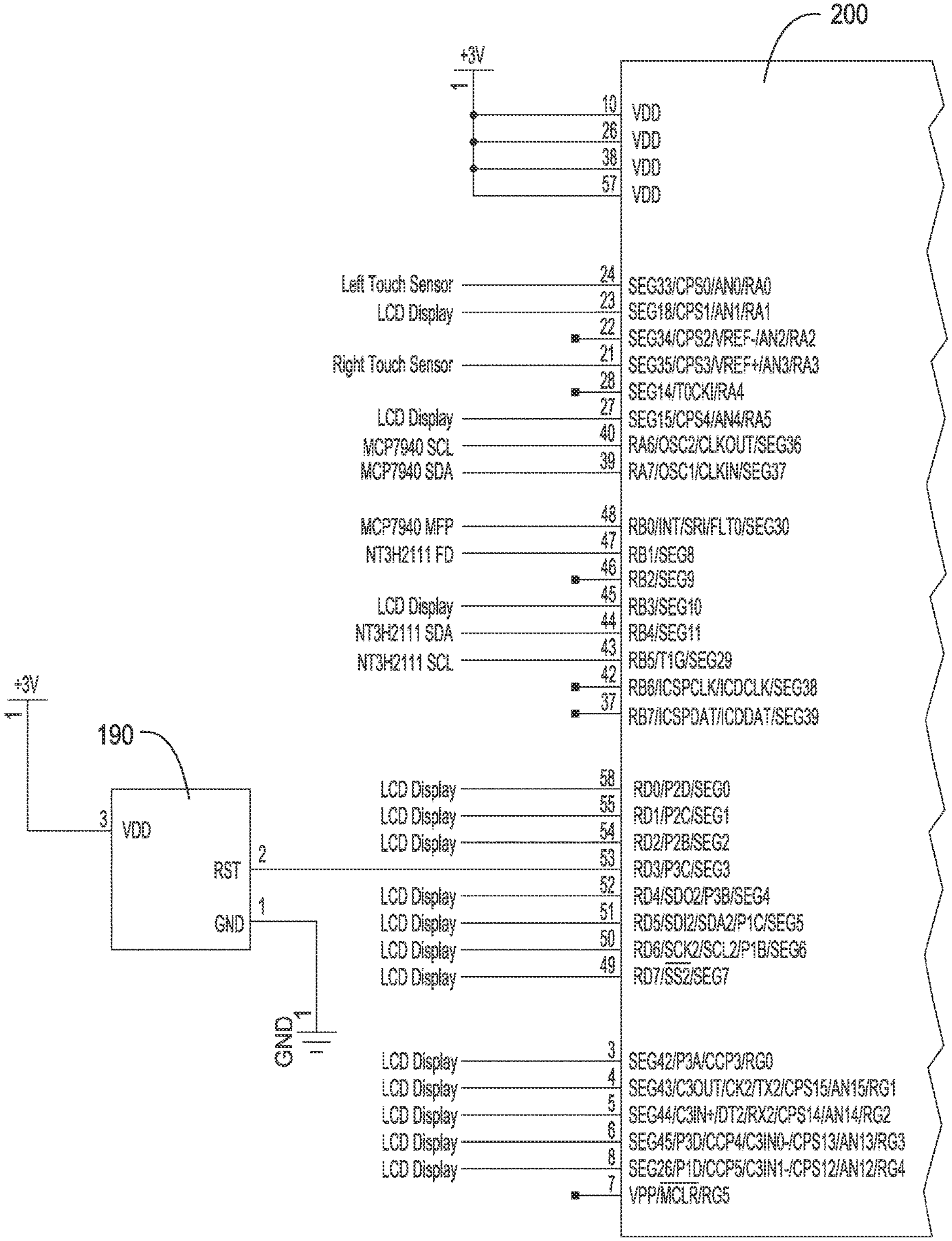

Adverting now to FIG. 14, battery monitor 190 is illustrated. The clock of the invention operates generally on a supply voltage of 4.5 VDC. This is achieved by three AA cell batteries, arranged in series. Circuit 190 comprises chip TLV803, manufactured by Texas Instruments, which is a 3-PIN Voltage Supervisor with Active-Low, Open-Drain Reset chip. In operation, this circuit monitors the battery voltage. When the voltage of the three batteries in series drops below 2.64 volts, a signal is sent to the microcontroller and, in turn, to the LCD display, to inform the user that it is time to change the batteries. The RESET pin connects to the microcontroller. If the signal on this pin is high, the voltage level is satisfactory; if the signal is low (below a threshold level), the voltage level is unsatisfactory and a warning message will be sent to the display by the microcontroller. Once the warning level is reached, the players probably will enjoy about 10-20 hours of additional play. The datasheet for this chip can be found here: http://www.ti.com/lit/ds/symlink/tlv803.pdf.

Figure 15:
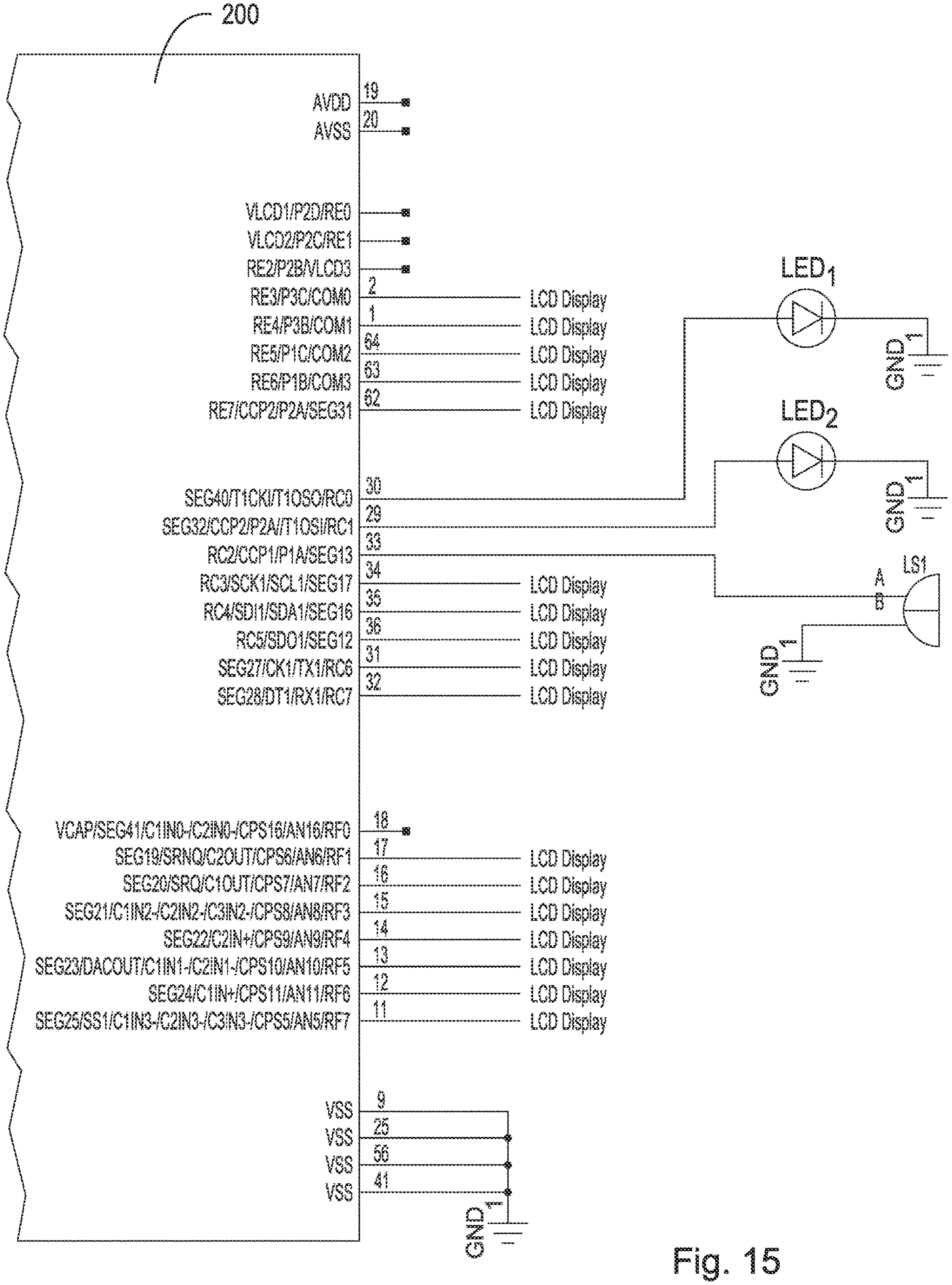

Microcontroller 200 is shown in FIGS. 14 and 15. From a top view, the left side of the microcontroller, and its associated pins, is shown in FIG. 14, and the right side of the microcontroller, and its associated pins, is shown in FIG. 15. Although the pins and their functions are largely self-explanatory to a person having ordinary skill in the art of designing and programming circuits using microcontrollers, a brief description of some of the functions follows. In the circuit shown, in a preferred embodiment, the microcontroller is model MCP7940, manufactured by Microchip Technology Inc. This is a real-time clock/calendar, operatively arranged when programmed to track time using internal counters for hours, minutes, seconds, days, months, years, and day of the week, although not all these functions are used for timing a chess game. The datasheet for this microcontroller can be found here: http://ww1.microchip.com/downloads/en/DeviceDoc/20005010F.pdf.

Adverting to FIG. 14, which shows the pins on the left side of the microcontroller chip, it is seen that pins 10, 26, 38 and 57 are connected to the 3 volt supply. Pin 24 is connected to left (first player) touch sensor 105, and pin 21 is connected to right (second player) touch sensor 106. Pins 23, 27, 58, 55, 54, 52, 51, 50, 49 3, 4, 5, 6, and 8 are all connected to LCD display 102. Pins 44 and 43 are connected to near field communication chip 161. Pins 40, 39 and 48 are connected to real-time clock/calendar chip 181.

Adverting to FIG. 15, which shows the pins on the right side of the microcontroller chip, it is seen that pins 9, 25, 41 and 56 are connected to ground; and pins 1, 2, 11, 12, 13, 14, 15, 16, 17, 18, 31, 32, 34, 35, 36, 62, 63 and 64 are connected to the LCD display. Pins 29 and 30 are tied to light emitting diodes $LED_2$ and $LED_1$, respectively, which, as described above, indicate which player is on move. The respective LED is active (lit) when a player's clock is running/decrementing. This allows both the players and the tournament director and spectators to see at a glance which player is on move. Finally, LS1 is a piezoelectric beeper which makes a short sound to alert the players that one of the players is out of time. This beeper is physically located beneath speaker 117.

To set the time on the clock, a user would touch software application icon 151 on mobile device 150, as shown on FIG. 4, which launches a software application to set the clock. A user has the option to set the time for a casual or single time control game of chess, a rated chess tournament game, or a game of Scrabble. Adverting now to FIG. 16, to make her selection, a user would tap chess icon 159, chess tournament icon 162, or Scrabble icon 163. The screen will highlight the selected icon. If a user wants to set the clock for a casual game of chess, for example, she would tap chess icon 159 on application screen 157. To set the time for player 1, a user would tap in the PLAYER 1 field 164 on the screen, and then tap either within the Hours, Minutes or Seconds field to adjust the time setting. If a player taps in the Hours field, for example, a drop down box (not shown) would appear, and the player would scroll to the desired number of hours and tap it to set the time. She would repeat this process for minutes and seconds. The procedure would be repeated to set the time for Player 2 within field 165. To set a time delay on the clock (where the display delays for a specified amount of time before decrementing), a user would tap the icon within field 166 labeled "DELAY" to adjust the length of the delay in seconds. To activate or deactivate the delay feature, a user would tap the on/off toggle button within field 166. To set an increment on the clock, a user would tap the icon within field 166 labeled "INCREMENT" to adjust the length of the added time in seconds. To activate or deactivate the increment feature, a user would tap the on/off toggle button within field 166. To set a notification that will generate a beeping sound should one player run out of time, a user would tap on/off toggle button 172. When a user finishes setting the time on application screen 157, she would then hold mobile device 150 proximate to wireless programmable chess clock 100, as shown in FIG. 18. Once the mobile device is "close enough" to the clock, the clock will receive the signals from the device and set the clock. The distance between the device and clock necessary for communication can vary. In a preferred embodiment, the near field communication circuit may be tuned such that a distance of 1-2" is sufficient for communication, so as to prevent interference from other devices and avoid errors in setting the clock, but this distance should not be considered limiting of any claims in the patent. The software application within mobile device 150 will communicate with near field communication module 160, allowing the time settings created by a user operating the software application to automatically synchronize with the wireless chess clock 100. Once wireless chess clock 100 synchronizes with the software application, the time set by a user for player 1 will appear on first player display 103, and the time set for player 2 will appear on second player display 104.

If a user sought to set the time controls for a chess tournament, she would tap chess tournament tab 162, as shown in FIG. 17. To set the number of time controls to be used in the tournament, a user would tap either the circle field labeled "2" to set two time controls or the circle field labeled "3" to set three time controls on application screen 158. To activate or deactivate the move-counting feature, a user would tap the on/off toggle button 167. To set the first time control, a user would tap first time control 168 to adjust the number of moves allotted to each player in that in time control as well as the length of time of each player's turn in hours and minutes. To set the second time control, a user would tap second time control 169 to adjust the number of moves allotted to each player in that in time control as well as the desired length of time of each player's turn in hours and minutes. To set a third time control, a user would tap third time control 171 to adjust the number of moves allotted to each player in that in time control as well as the length of time of each player's turn in hours and minutes. To activate or deactivate the delay feature, a user would tap the on/off toggle button at the bottom of application screen. To set an increment on the clock, a user would tap the icon at the bottom of application screen labeled "INCREMENT" to adjust the length of the added time in seconds. To activate or deactivate the increment feature, a user would tap the on/off toggle button at the bottom of the application screen. To set a notification that will generate a beeping sound at the conclusion, a user would tap on/off toggle button 172. When a user finishes setting the time on the software application, she would then hold mobile device 150 horizontally not more than two inches above top surface of housing 101 as shown in FIG. 18. The software application will communicate with near field communication module 160, allowing the time settings created by a user operating the software application to automatically synchronize with, and set wireless chess clock 100. Once wireless chess clock 100 synchronizes with the software application, the time control settings set by a user will appear on first player display 103 and second player display 104.

With respect to setting the number of moves permitted in a first, second or third time control, as indicated above, it should be appreciated that the clock itself can keep track of the number of moves made by each player, simply by counting the number of times a player hits her respective sensor button. This counting is performed by the microcontroller. The clock is operatively arranged to freeze the display should a player "not make time control", i.e., not make the required number of moves within a preset time control period. It is also possible that the players are playing on a sensory chess board in communication with the clock, and that the board is operatively arranged to count the moves as well. In such a configuration, the time, the number of moves, and the time controls settings can be transmitted to a personal computer, which can also indicate if a player loses on time for not making the time control.

Finally, it should be appreciated that many chess players play repeatedly in a number of different tournaments, with each tournament having its own time control. The software application of the present invention, although not shown in the drawings, includes a drop-down list of stored/saved "favorites" of frequently used settings, thereby allowing the player to save time in selecting a setting for a particular tournament.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 housing
11 housing

20 first player clock display
21 first player clock display
30 second player clock display
31 second player clock display
40 first player touch sensor
41 first player push button
50 second player touch sensor
51 second player push button
60 first player LED indicator
70 second player LED indicator
80 central power switch
81 on/off switch
82 enter button
83 "minus" button
84 "plus" button
85 sound button
100 wireless programmable chess clock
101 top surface of housing
102 display
103 first player display
104 second player display
105 first player touch sensor
106 second player touch sensor
107 first player LED indicator
108 second player LED indicator
109 top housing member
110 front surface of housing
111 base of housing
112 first foot on base
113 second foot on base
114 third foot on base
115 fourth foot on base
116 battery compartment door
117 speaker
118 display housing member
119 sensor electronic board
120 base housing member
140 hand of player holding mobile device
145 wireless NFC signals transmitted from mobile device to clock
150 mobile device
151 software application icon
152 chess board
153 chess table
154 first player
155 second player
156 chess pieces
157 first application screen
158 second application screen
159 chess application icon
160 near field communication module
161 near field communication chip
162 chess tournament icon
163 Scrabble icon
164 PLAYER 1 field
165 PLAYER 2 field
166 DELAY/INCREMENT field
167 move counter button
168 first time control field
169 second time control field
170 voltage regulator
171 third time control field
172 sound button
174 voltage regulator chip
190 battery life monitor circuit
180 clock oscillator circuit
181 real-time clock/calendar chip

200 microcontroller
$C_1$ 100 pF capacitor
$C_2$ 12 pF capacitor
$C_3$ 12 pF capacitor
$LED_1$ light emitting diode
$LED_2$ light emitting diode
$Q_1$ quartz crystal oscillator (32.768 kHz)
$R_1$ 2.2 kΩ resistor
$R_2$ 2.2 kΩ resistor
$R_3$ 2.2 kΩ resistor
$R_4$ 2.2 kΩ resistor
$R_5$ 2.2 kΩ resistor
$R_6$ 2.2 KΩ resistor

What is claimed is:

1. A combination programmable digital chess clock and software, comprising:

a programmable digital chess clock operatively arranged to receive near-field communication signals, said signals containing information necessary to initially set a first player clock display and a second player clock display on said programmable digital chess clock, thereby displaying a first time allocated to said first player on said first display to play a game of chess and a second time allocated to said second player on said second display to play said game of chess, wherein said information also includes information necessary for setting said first player clock display and said second player clock display for a plurality of time periods for said game of chess, wherein said programmable digital chess clock is adapted to communicate with a mobile device running software, said software stored on said mobile device, said mobile device having a touch screen, said software causing said mobile device to display an icon, which, when touched, causes a processor of said mobile device to:

display a first player field and a second player field on said mobile device, said first player field display corresponding to said first player clock display and said second player field display corresponding to said second player clock display;

populate said first time in said first player field and said second time in said second player field upon an input to said mobile device, said input comprising said touch screen of said mobile device, said touch screen operatively arranged to detect touch from a user, wherein said time corresponds to at least one of said plurality of time periods for said game of chess; and, transmit said information via said near-field communication signals from said mobile device to said programmable chess clock upon placing said mobile device within two inches of said programmable chess clock to set said first player clock display with said first time on said first player field display and to set said second player clock display with said second time on said second player field display.

2. The combination programmable digital chess clock and software recited in claim 1, wherein said time comprises hours, minutes, and seconds.

3. The combination programmable digital chess clock and software recited in claim 1 further comprising:

a microcontroller operatively arranged to set and control said first and second player clock displays;

a first switch in communication with said microcontroller and said first player clock display;

a second switch in communication with said microcontroller and said second player clock display; and, a third switch in communication with said microcontroller, wherein said time on each of said player clock displays may be set by physically actuating said switches.

4. The combination programmable digital chess clock and software recited in claim 3, wherein said first, second, and third switch comprise at least one of: a push button; a touch sensor; and, a combination thereof.

5. The combination programmable digital chess clock and software recited in claim 1, wherein said information further comprises one or more of: a time delay or a time increment.

6. The combination programmable digital chess clock and software recited in claim 5, wherein said time delay is selected from the group consisting of: Simple; Fischer; and, Bronstein.

7. The combination programmable digital chess clock and software recited in claim 5, wherein said time delay is in seconds.

8. The combination programmable digital chess clock and software recited in claim 5, wherein said time increment is in seconds.

9. A combination programmable digital chess clock and software, comprising:

a programmable digital chess clock operatively arranged to receive near-field communication signals, said signals containing information necessary to initially set a first player clock display and a second player clock display on said programmable digital chess clock, thereby displaying a first time allocated to said first player on said first display to play a game of chess and a second time allocated to said second player on said second display to play said game of chess, wherein said information also includes information necessary for setting said first player clock display and said second player clock display for a plurality of time periods for said game of chess; and, a mobile device operatively arranged to run software, said software stored on said mobile device, said mobile device having a touch screen, said software causing said mobile device to display an icon, which, when touched, causes a processor of said mobile device to:

display a first player field and a second player field on said mobile device, said first player field display corresponding to said first player clock display and said second player field display corresponding to said second player clock display;

populate said first time in said first player field and said second time in said second player field upon an input to said mobile device, said input comprising said touch screen of said mobile device, said touch screen operatively arranged to detect touch from a user, wherein said time corresponds to at least one of said plurality of time periods for said game of chess; and, transmit said information via said near-field communication signals from said mobile device to said programmable chess clock upon placing said mobile device within two inches of said programmable chess clock to set said first player clock display with said first time on said first player field display and to set said second player clock display with said second time on said second player field display.

10. The combination programmable digital chess clock and mobile device recited in claim 9, wherein said time comprises hours, minutes, and seconds.

11. The combination programmable digital chess clock and mobile device recited in claim 9 further comprising:

a microcontroller operatively arranged to set and control said first and second player clock displays;

a first switch in communication with said microcontroller and said first player clock display;

a second switch in communication with said microcontroller and said second player clock display; and, a third switch in communication with said microcontroller, wherein said time on each of said player clock displays may be set by physically actuating said switches.

12. The combination programmable digital chess clock and mobile device recited in claim 11, wherein said first, second, and third switch comprise at least one of: a push button; a touch sensor; and, a combination thereof.

13. The combination programmable digital chess clock and mobile device recited in claim 9, wherein said information further comprises one or more of: a time delay or a time increment.

14. The combination programmable digital chess clock and mobile device recited in claim 13, wherein said time delay is selected from the group consisting of: Simple; Fischer; and, Bronstein.

15. The combination programmable digital chess clock and mobile device recited in claim 13, wherein said time delay is in seconds.

16. The combination programmable digital chess clock and mobile device recited in claim 13, wherein said time increment is in seconds.

* * * * *